(12) United States Patent
Ohmiya et al.

(10) Patent No.: US 8,350,916 B2
(45) Date of Patent: Jan. 8, 2013

(54) IMAGE PROCESSING DEVICE, PHOTOGRAPHING DEVICE, REPRODUCING DEVICE, INTEGRATED CIRCUIT, AND IMAGE PROCESSING METHOD

(75) Inventors: Jun Ohmiya, Kyoto (JP); Masayuki Kimura, Osaka (JP); Hitoshi Yamada, Osaka (JP)

(73) Assignee: Panasonic Corporation, Osaka (JP)

(*) Notice: Subject to any disclaimer, the term of this patent is extended or adjusted under 35 U.S.C. 154(b) by 373 days.

(21) Appl. No.: 12/743,900

(22) PCT Filed: Dec. 2, 2008

(86) PCT No.: PCT/JP2008/003553
§ 371 (c)(1),
(2), (4) Date: May 20, 2010

(87) PCT Pub. No.: WO2009/072264
PCT Pub. Date: Jun. 11, 2009

(65) Prior Publication Data
US 2010/0245604 A1    Sep. 30, 2010

(30) Foreign Application Priority Data

Dec. 3, 2007  (JP) ................................. 2007-312174

(51) Int. Cl.
*H04N 5/228* (2006.01)
*G03B 17/00* (2006.01)
(52) U.S. Cl. .................. 348/208.99; 348/208.4; 396/55
(58) Field of Classification Search ............ 348/208.99, 348/208.2, 208.4, 208.6; 396/55
See application file for complete search history.

(56) References Cited

U.S. PATENT DOCUMENTS 7,834,908 B2 * 11/2010 Hatanaka .................. 348/208.4
(Continued)

FOREIGN PATENT DOCUMENTS

JP          7-20547          1/1995
(Continued)

OTHER PUBLICATIONS

Supplementary European Search Report (in English language) issued Jan. 11, 2011 in corresponding European Patent Application No. 08856458.

(Continued)

*Primary Examiner* — John Villecco
*Assistant Examiner* — Selam Gebriel
(74) *Attorney, Agent, or Firm* — Wenderoth, Lind & Ponack, LLP

(57) ABSTRACT

To provide an image processing device that calculates a parameter used for correcting large video jitter with high accuracy even when the accuracy of a sensor for measuring a movement of a photographing device is low. The image processing device includes: a constraint condition generating unit (130) that generates a constraint condition using sensor information such that a parameter value falls within a range; and a parameter calculating unit (140) that calculates the parameter according to the constraint condition. The constraint condition generating unit (130) has: a feature vector generating unit (131) that generates a feature vector showing features of the sensor information; and a motion classifying unit (such as 132) that identifies a movement of the photographing device according to the feature vector generated by the feature vector generating unit (131), on the basis of an association between the feature vector and the movement of the photographing device, the association being obtained as a result of previously-executed machine learning of the feature vector and an actual movement of the photographing device. The constraint condition generating unit (130) determines the range corresponding to the information of the movement of the photographing device, the movement being identified by the motion classifying unit (such as 132).

17 Claims, 19 Drawing Sheets

U.S. PATENT DOCUMENTS

| | | | |
|---|---|---|---|
| 8,072,499 B2 * | 12/2011 | Nagata | 348/208.6 |
| 2003/0067544 A1 | 4/2003 | Wada | |
| 2006/0098967 A1 * | 5/2006 | Togawa | 396/55 |
| 2006/0228049 A1 | 10/2006 | Gensolen et al. | |
| 2009/0244299 A1 * | 10/2009 | Fukunishi | 348/208.4 |
| 2009/0309984 A1 | 12/2009 | Bourgain et al. | |
| 2010/0271494 A1 * | 10/2010 | Miyasako | 348/208.1 |
| 2012/0105654 A1 * | 5/2012 | Kwatra et al. | 348/208.4 |

FOREIGN PATENT DOCUMENTS

| | | |
|---|---|---|
| JP | 10-23322 | 1/1998 |
| JP | 2003-110929 | 4/2003 |
| JP | 2004-158902 | 6/2004 |
| JP | 2006-343652 | 12/2006 |
| JP | 2007-228154 | 9/2007 |
| JP | 2007-233166 | 9/2007 |
| WO | 2008/000711 | 1/2008 |

OTHER PUBLICATIONS

Partial English translation of JP 2004-158902, which was cited in the IDS filed Jun. 25, 2010.

Kotake D., et al., "*A hybrid and Linear Registration Method Utilizing Inclination Constraint*", Mixed and Augmented Reality, 2005. Proceedings. Fourth IEEE and ACM International Symposium on Vienna, Austria Oct. 5-8, 2005, Piscataway, NJ, USA, IEEE, Oct. 5, 2005, pp. 140-149, XP010856772, ISBN: 978-0-7695-2459-7.

International Search Report issued Feb. 3, 2009 in International (PCT) Application No. PCT/JP2008/003553.

Russian Office Action (with English translation) issued Sep. 18, 2012 in corresponding Russian Patent Application No. 2010122599.

V. Dorot, etc. "Dictionary of modern computer vocabulary (edition 3)" BHV-Petersburg, St. Petersburg, 2004-L1- p. 211 with partial translation.

* cited by examiner

IMAGE PROCESSING DEVICE, PHOTOGRAPHING DEVICE, REPRODUCING DEVICE, INTEGRATED CIRCUIT, AND IMAGE PROCESSING METHOD

TECHNICAL FIELD

The present invention relates to photographing devices such as cameras.

BACKGROUND ART

In recent years, with the progress in the reduction in size and weight of cameras, it has become common that a photographer shoots video while supporting a camera with hands. Also, so-called "hands-free" image capturing has been enjoyed whereby, for shooting video, a photographer attaches a camera to the eyeglasses, clothing, or hat of the photographer, instead of supporting the camera with hands. When the video is shot using such a compact camera attached to the eyeglasses, clothing, or hat of the photographer, certain problems have become apparent which were not even problematic in the case of a conventional large heavy camera. One of the problems is video jitter existing in the shot video. When a camera is smaller and lighter, that is, when the degree of flexibility in image capturing for a photographer is higher, this video jitter becomes more prominent. To address this problem, techniques to prevent or correct video jitter have been conventionally developed.

Examples of the conventional techniques to prevent or correct video jitter include electronic image stabilizing systems and optical image stabilizing systems. Some of these electronic image stabilizing systems and optical image stabilizing systems detect jitter caused during an image capturing, using various sensors such as an acceleration sensor, a gyroscopic sensor, and a tilt sensor so as to improve the performance in preventing or correcting the video jitter (see Patent Reference 1, for example). An image stabilizing device disclosed in Patent Reference 1 obtains information regarding a tendency of jitter using a tilt sensor. Using the obtained information regarding the tendency of jitter, this image stabilizing device makes an image search (matching) in order to detect the amount of jitter and the direction of jitter. As a result, the image stabilizing device disclosed in Patent Reference 1 can reduce the amount of calculation necessary to detect the amount of jitter and the direction of jitter.

Moreover, a technique of reducing video jitter by more positively using jitter information obtained from a sensor has been proposed (see Patent Reference 2). An image stabilizing device disclosed in Patent Reference 2 predicts jitter movement to be caused at the moment of image capturing, by learning sensor data received in chronological order. Using the information of the predicted jitter movement, this image stabilizing device reduces the jitter by driving a jitter correction lens in such a manner as to counteract the jitter movement. As a result, the image stabilizing device disclosed in Patent Reference 2 can reduce the jitter corresponding to the characteristics of the actual shake caused by hand movements (due to habits of a photographer or a weight balance of interchangeable lenses attached to the camera body, for instance).

Patent Reference 1: Japanese Unexamined Patent Application Publication No. 2006-343652
Patent Reference 2: Japanese Unexamined Patent Application Publication No. 7-20547

DISCLOSURE OF INVENTION

Problems that Invention is to Solve

However, in the cases of the image stabilizing devices respectively disclosed in Patent Literature 1 and Patent Literature 2, it is assumed that video jitter is corrected in a static image capturing condition, where a stable signal can be obtained from a sensor. This is to say, the image stabilizing devices respectively disclosed in Patent Literature 1 and Patent Literature 2 do not assume a case where a photographer shoots video while moving around, using a compact lightweight camera being supported by the photographer's hands or using a hands-free camera attached to the photographer. In the case of hands-free image capturing, the image capturing condition is unstable because the photographer does not support the camera with hands. Moreover, in the case of hands-free image capturing, vibration caused by walking is added to the camera. When a small-sized, low-priced sensor is used under such an image capturing condition, noise such as inertial noise or cross-axis sensitivity is superimposed on an output signal from the sensor, thereby extremely decreasing the reliability of the output signal from the sensor. Hence, the conventional technique of correcting video jitter has a problem that an output signal from a sensor cannot be used for correcting the video jitter when the reliability of the output signal from the sensor is low.

The present invention is conceived in view of the stated problems and has an object to provide an image processing device and so forth capable of calculating a parameter used for correcting large video jitter with high accuracy even when the accuracy of a sensor for measuring movements of a photographing device is low.

Means to Solve the Problems

In order to achieve the aforementioned object, the image processing device in an aspect of the present invention is an image processing device that calculates a parameter used in alignment performed on at least two images captured by a photographing device that has a sensor detecting a movement, the image processing device including: an image obtaining unit which obtains an image captured by the photographing device; a sensor information obtaining unit which obtains sensor information that is an output signal from the sensor, the output signal being provided when the image obtained by the image obtaining unit is captured; a constraint condition generating unit which generates a constraint condition using the sensor information obtained by the sensor information obtaining unit such that a value of a parameter to be calculated falls within a range; and a parameter calculating unit which calculates the parameter related to the image obtained by the image obtaining unit, according to the constraint condition generated by the constraint condition generating unit, wherein the constraint condition generating unit includes: a feature vector generating unit which generates a feature vector showing a feature of the sensor information obtained by the sensor information obtaining unit; and a motion classifying unit which identifies a movement of the photographing device according to the feature vector generated by the feature vector generating unit, on the basis of an association between the feature vector and the movement of the photographing device, the association is obtained as a result of previously-executed machine learning of the feature vector and an actual movement of the photographing device, and the constraint condition generating unit generates the constraint condition by determining the range corresponding to the movement of the photographing device, the movement being identified by the motion classifying unit.

With this, the movement of the photographing device can be identified using the information in which the feature vector and the actual movement of the photographing device has been associated with each other through the machine learning that is executed in advance. Thus, when the reliability of the output signal from the sensor is low, the movement of the photographing device can be identified with high accuracy. Using the constraint condition generated corresponding to the movement of the photographing device identified in this way, the parameter can be calculated. Accordingly, the parameter used in the alignment to be performed between the images can be calculated with high accuracy.

EFFECTS OF THE INVENTION

As apparent from the above description, the image processing device of the present invention can calculate the parameter used for correcting large video jitter with high accuracy even when the accuracy of the sensor for measuring the movements of the photographing device is low.

BRIEF DESCRIPTION OF DRAWINGS

FIG. 5 is a diagram showing an example of a histogram of a tilt parameter a.

Figure 1:
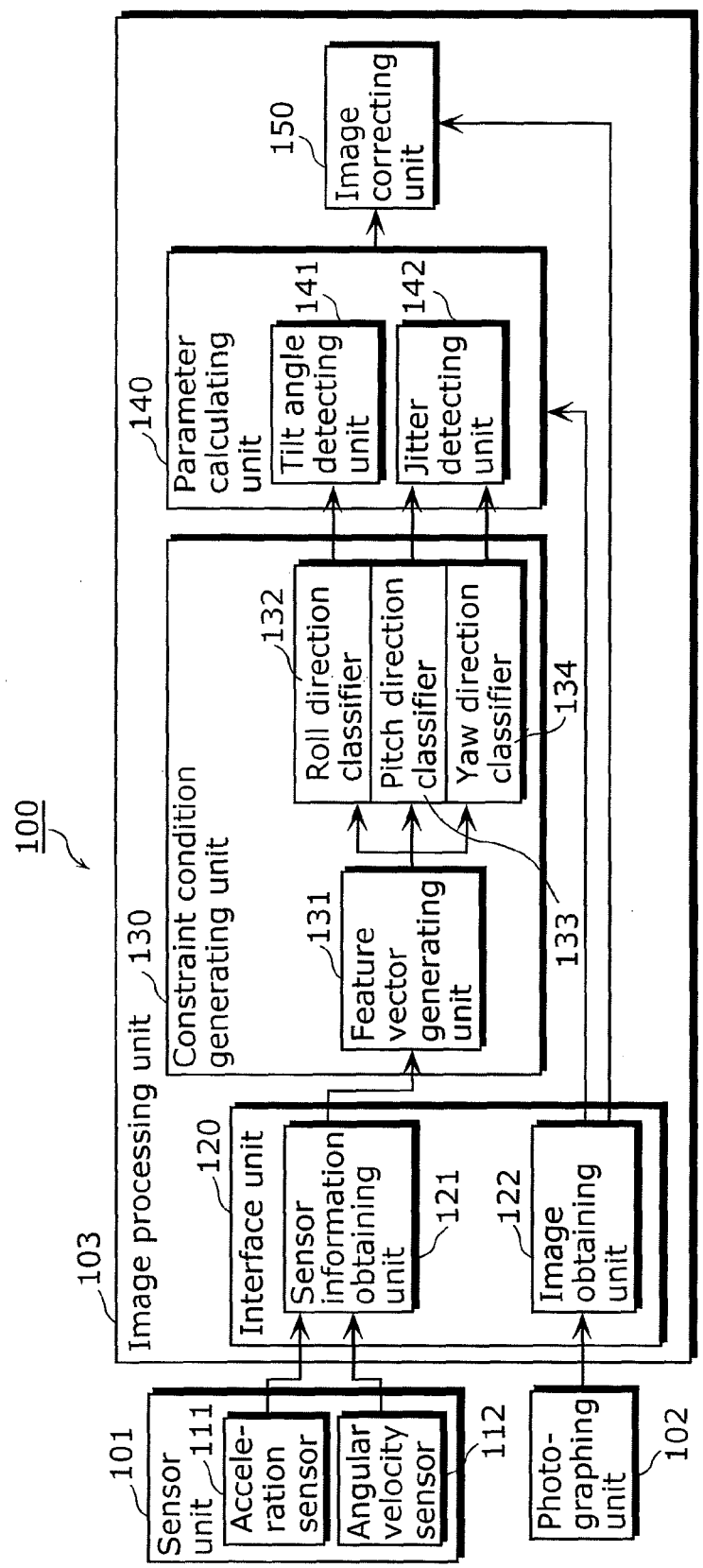
FIG. 1 is a block diagram showing a function configuration of a photographing device in a first embodiment of the present invention.

NUMERICAL REFERENCES 100, 1000, 2000, 3000 Photographing device
101 Sensor unit
102 Photographing unit
103 Image processing unit
111 Acceleration sensor
112 Angular velocity sensor
120 Interface unit
121 Sensor information obtaining unit
122 Image obtaining unit
130 Constraint condition generating unit
131 Feature vector generating unit
132 Roll direction classifier
133 Pitch direction classifier
134 Yaw direction classifier
140 Parameter calculating unit
141 Tilt angle detecting unit
142 Jitter detecting unit
150 Image correcting unit
501, 502 Character image
503 Motion vector
510, 520 Rectangular area
511, 521 Area
1001 First angular velocity sensor
1002 Second angular velocity sensor
2001 Orientation sensor
3001 Drive control unit
3002 Driving unit
3003 Active prism
3004 Lens
3005 Imaging element
4000 Integrated circuit
5000 Reproducing device
5001 Reproducing unit

BEST MODES FOR CARRYING OUT THE INVENTION

The following is a description of embodiments of the present invention, with reference to the drawings.

First Embodiment

FIG. 1 is a block diagram showing a function configuration of a photographing device 100 in the first embodiment of the present invention. As shown in FIG. 1, the photographing device 100 includes a sensor unit 101, a photographing unit 102, and an image processing unit 103.

The sensor unit 101 has an acceleration sensor 111 and an angular velocity sensor 112. The sensor unit 101 measures movements of the photographing device 100, based on acceleration in three axis directions (x, y, and z axis directions) which are orthogonal to one another and based on angular velocities of rotations (roll, pitch, and yaw) around these three axes. Then, the sensor unit 101 outputs the measurement results to the image processing unit 103.

Figure 2:
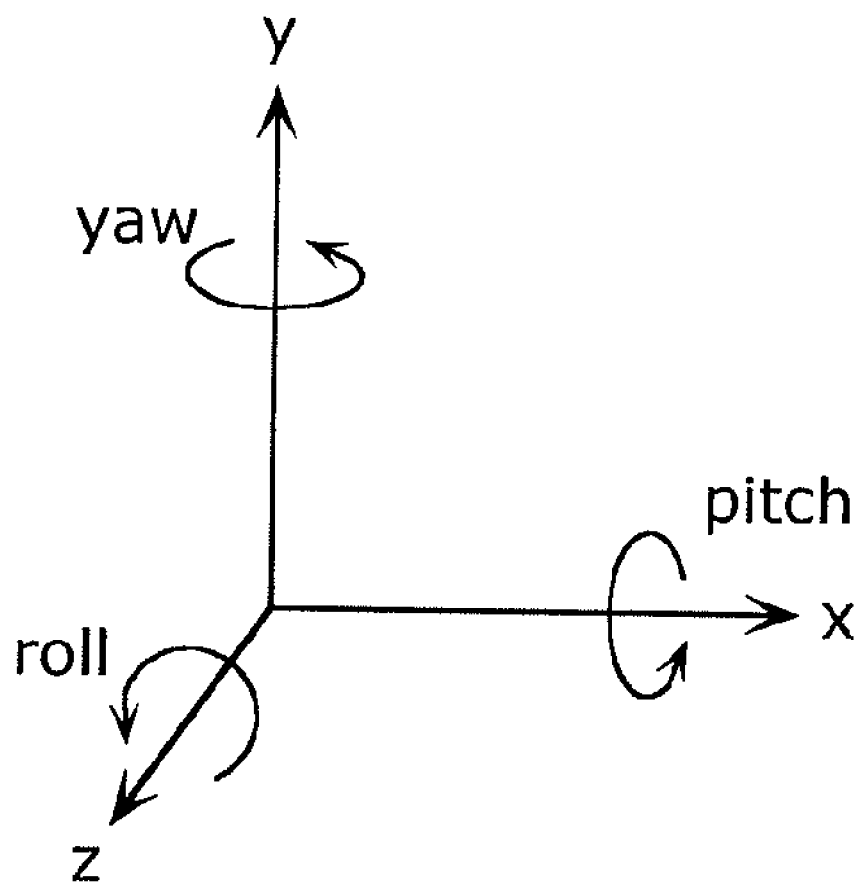
FIG. 2 is a diagram showing measurement axes of an acceleration sensor and an angular velocity sensor.

It should be noted that, for convenience of explanation, an x-y-z coordinate system is set such that an optical axis of a lens in the photographing device 100 coincides with the z axis, in the present embodiment. Regarding the angular velocities in the three rotational directions (roll, pitch, and yaw) shown in FIG. 2, the clockwise rotation about each axis is in a positive direction while the counterclockwise rotation about each axis is in a negative direction, when viewed from the origin point.

Moreover, the sensor unit 101 converts analog output signals received from the acceleration sensor 111 and the angular velocity sensor 112 into digital signals. To be more specific, the sensor unit 101 has an ADC (Analog to Digital Converter) which is not shown, and outputs the digital signals to the image processing unit 103. Note that although the present embodiment describes a case where the sensor unit 101 outputs the digital signals, the photographing device of the present invention is not limited to such a photographing device. For example, the image processing unit 103 may convert the analog signals provided from the sensor unit 101 into the digital signals.

The photographing unit 102 has a lens, an imaging element, and so forth, and captures an image of a subject. Then, the photographing unit 102 outputs the captured image of the subject to the image processing unit 103 and the like.

The image processing unit 103 is a processing unit configured by a CPU (Central Processing Unit), a memory, and so forth, and includes an interface unit 120, a constraint condition generating unit 130, a parameter calculating unit 140, and an image correcting unit 150.

The interface unit 120 has a sensor information obtaining unit 121 and an image obtaining unit 122. The sensor information obtaining unit 121 obtains output signals from the sensor unit 101 as sensor information. These output signals are provided when at least two images included in video data obtained by the image obtaining unit 122 are respectively captured. The image obtaining unit 122 obtains the video data including at least two images captured by the photographing unit 102.

The constraint condition generating unit 130 has a feature vector generating unit 131, a roll direction classifier 132, a pitch direction classifier 133, and a yaw direction classifier 134. Using the sensor information obtained by the sensor information obtaining unit 121, the constraint condition generating unit 130 generates a constraint condition such that a parameter value falls within a predetermined range when the parameter is determined by calculation.

The feature vector generating unit 131 generates a feature vector showing features of the sensor information obtained by the sensor information obtaining unit 121.

The roll direction classifier 132, the pitch direction classifier 133, and the yaw direction classifier 134 are examples of a motion classifying unit. On the basis of an association between the feature vector and a movement of the photographing device 100, the roll direction classifier 132, the pitch direction classifier 133, and the yaw direction classifier 134 identify the directions of respective rotations (roll, pitch, and yaw) about the axes of the photographing device 100 according to the feature vector generated by the feature vector generating unit 131. It should be noted that identifying a direction of movement about an axis of the photographing device 100 includes identifying no movement in any direction. Also note that the association between the feature vector and the movement of the photographing device 100 is obtained as a result of previously-executed machine learning of feature vectors and actual movements of the photographing device 100. Machine learning allows a computer to analyze a plurality of sample data sets and then to extract useful rules, criteria, and the like from the data.

The parameter calculating unit 140 has a tilt angle detecting unit 141 and a jitter detecting unit 142. Using the video data obtained by the image obtaining unit 122 and the constraint conditions generated by the constraint condition generating unit 130, the parameter calculating unit 140 calculates parameters used in alignment performed between images which are temporally adjacent (hereafter, such images are simply referred to as the adjacent images).

According to the constraint condition generated by the constraint condition generating unit 130 such that a solution falls within a predetermined range, the tilt angle detecting unit 141 calculates a tilt angle of the image as a parameter by extracting, from the image, a tilt of an element that shows the absolute horizontal or the absolute vertical.

According to the constraint condition generated by the constraint condition generating unit 130 such that a solution falls within a predetermined range, the jitter detecting unit 142 calculates the relative amount of displacement of the subject, as a parameter, between two images that are included in the video data and temporally adjacent.

On the basis of the parameters calculated by the parameter calculating unit 140 for alignment to be performed between the images, the image correcting unit 150 performs the alignment between the images of adjacent frames included in the video data.

The following is an explanation of an operation performed by the photographing device 100 in the present embodiment that is configured as described so far.

Figure 3:
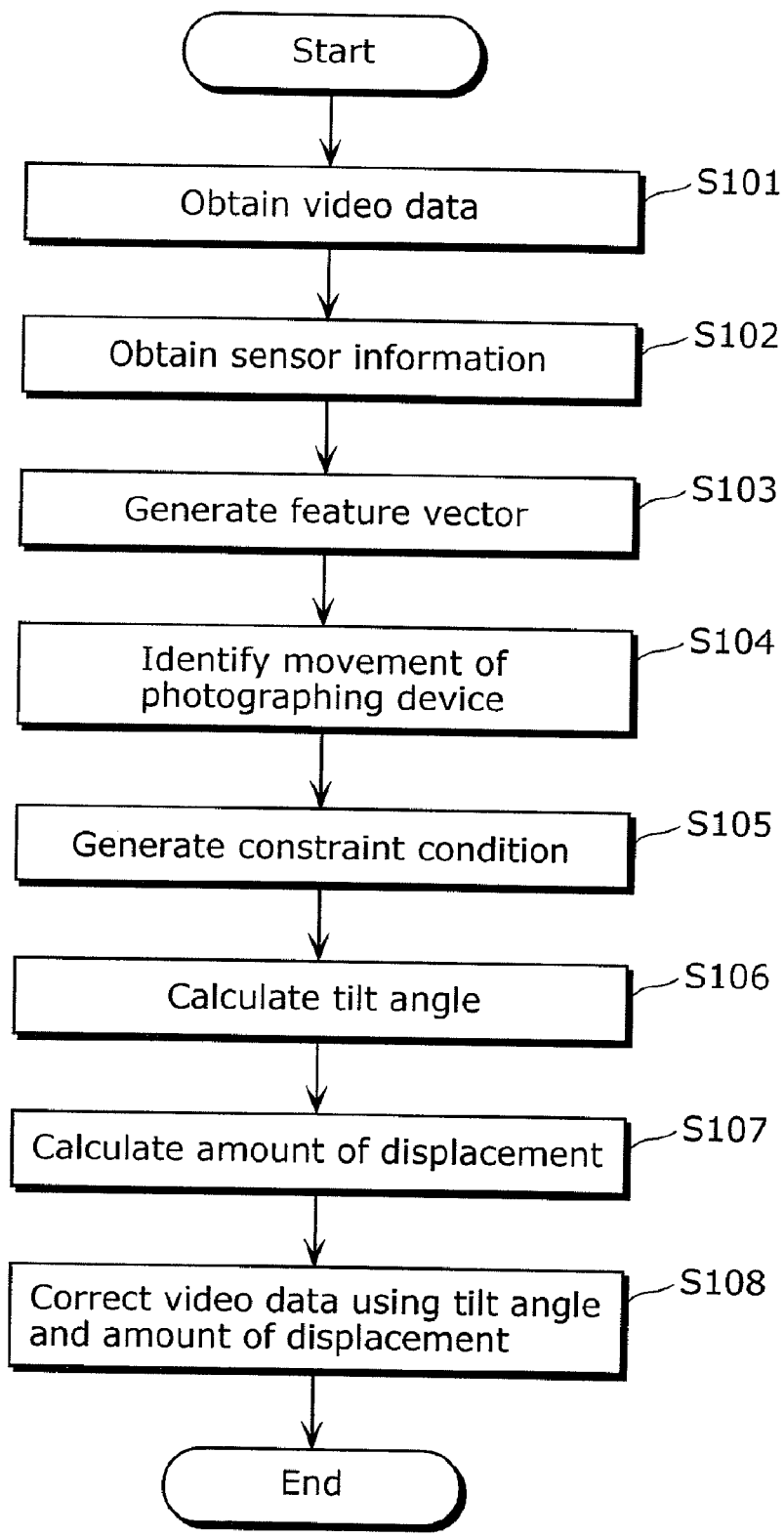
FIG. 3 is a flowchart showing an operation performed by an image processing unit 103 included in the photographing device in the first embodiment.

FIG. 3 is a flowchart showing an operation performed by the image processing unit 103 included in the photographing device 100 in the first embodiment.

First, the image obtaining unit 122 obtains the video data generated by the photographing unit 102 (step S101). Following this, the sensor information obtaining unit 121 obtains the sensor information that is obtained through the measurements made by the sensor unit 101 at the time of video capturing (step S102). To be more specific, the sensor information obtaining unit 121 obtains the acceleration in the axis directions (x, y, and z axis directions) and the angular velocities of rotations (roll, pitch, and yaw) which are respectively measured by the acceleration sensor 111 and the angular velocity sensor 112 (step S102).

Next, the feature vector generating unit 131 generates the feature vector showing the features of the sensor information, by executing various operations using the obtained sensor information (step S103). Then, according to the feature vector generated by the feature vector generating unit 131, each of the rotational direction classifiers (the roll direction classifier 132, the pitch direction classifier 133, and the yaw direction classifier 134) identifies the movement of the photographing device 100 in the corresponding direction (step S104). On the basis of the movement of the photographing device 100 in each rotational direction that is identified by the corresponding rotational direction classifier, the constraint condition generating unit 130 generates a constraint condition such that the range of a parameter value that is to be a solution is limited when the parameter is calculated by the parameter calculating unit 140 (step S105).

Then, according to the constraint condition generated by the constraint condition generating unit 130, the tilt angle detecting unit 141 calculates a tilt angle of the image as the parameter by extracting, from the image, a tilt of an element that shows the absolute horizontal or the absolute vertical (step S106). Moreover, according to the constraint condition generated by the constraint condition generating unit 130, the jitter detecting unit 142 calculates the relative amount of displacement of the subject, as the parameter, between two images that are included in the video data and temporally adjacent (step S107).

Lastly, the image correcting unit 150 corrects the video data obtained by the image obtaining unit 122, using the parameters respectively calculated by the tilt angle detecting unit 141 and the jitter detecting unit 142 (step S108).

The following is a detailed explanation of the processing for each step shown in FIG. 3. First, the processing performed by the feature vector generating unit 131 (step S103 in FIG. 3) is described in detail.

The feature vector generating unit 131 generates the feature vector showing the features of the sensor information, using the sensor information (the acceleration and angular velocities in the three axis directions) obtained by the sensor information obtaining unit 121. More specifically, the feature vector generating unit 131 reads the sensor information (the sensor information obtained by the sensor information obtaining unit 121) stored in chronological order in a buffer that is not shown but included in the constraint condition generating unit 130, and executes predetermined operations using the read sensor information. For example, the feature vector generating unit 131 executes operations, such as comparing the magnitudes of the acceleration in the axis directions measured by the acceleration sensor 111 at a same time t or calculating a difference value of the angular velocities in the roll direction measured by the angular velocity sensor 112 at a time t−1 and the time t. Then, the feature vector generating unit 131 generates the feature vector which is made up of a code obtained by encoding the results of the operations mentioned above according to a predetermined rule (an encoding rule). Here, the encoding rule refers to a rule whereby, for example, when a positive value is obtained as a result of a certain operation, "1" is given, and otherwise, "−1" is given. Alternatively, the encoding rule refers to a rule whereby, for example, when sensor output values are compared, "1" is given to the largest sensor output value and "−1" is given to the rest of the sensor output values. In this way, the feature vector generating unit 131 performs the various operations using the sensor output values stored in the buffer and then accordingly generates a feature vector x(i) which is a code string showing the operation results. It should be noted here that the encoding rule of the photographing device 100 in the present embodiment is not limited to such rules as mentioned above.

Next, the processing (step S104 in FIG. 3) performed by the rotational direction classifiers (the roll direction classifier 132, the pitch direction classifier 133, and the yaw direction classifier 134) is explained in detail.

Each of the rotational direction classifiers is configured by a strong classifier which is obtained through a machine learning algorithm called AdaBoost. Here, AdaBoost is an example of Boosting algorithms, and is a machine learning algorithm whereby one high-performance classifier (strong classifier) is configured by combining a number of low-performance classifiers (weak classifiers) with weights being assigned.

Figure 4:
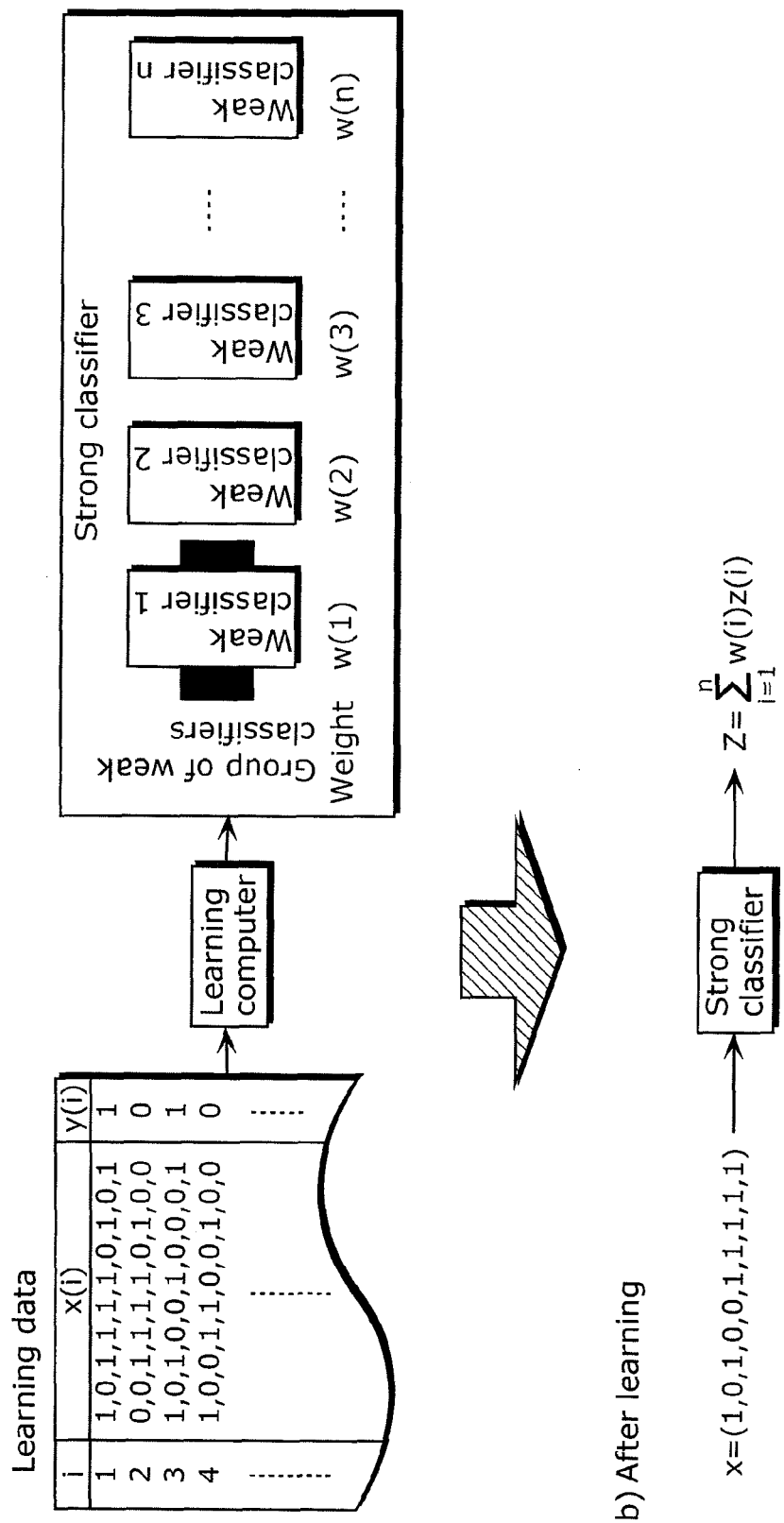
FIGS. 4(a) and (b) are diagrams for explaining about Ada-Boost.

FIGS. 4(a) and (b) are diagrams for explaining about AdaBoost. As shown in FIG. 4(a), when learning is executed according to AdaBoost, a learning computer first obtains a plurality of sets of learning data each of which is a combination of a feature vector x(i) and an actual movement y(i) of the photographing device 100, the actual movement y(i) being identified when the feature vector x(i) is obtained. When a rotational axis rotates in the positive direction, "1" is assigned as a code to the movement y(i), and otherwise, "−1" is assigned as a code to the movement y(i). There must be a certain association between the feature vector x(i) generated using the sensor information and the coded movement y(i) of the photographing device 100. This being so, the learning computer corrects simple hypotheses (such as "when the third element of the feature vector x is 1, y is 1") one after another which are respectively suggested by the combinations of x(i) and y(i) obtained as mentioned above. As a result, an accuracy rate is determined for each of the hypotheses. Then, the learning computer determines the classifier which adopts the hypothesis with the highest accuracy rate as being a weak classifier. Note that an output of the weak classifier is also a code having a value of "1" or "−1". Moreover, the learning computer repeatedly determines new weak classifiers which focus on classifying the features misclassified by previously-determined weak classifiers. As a result of the learning this way, the learning computer generates a strong classifier configured by a plurality of weak classifiers and weights assigned to the weak classifiers based on the accuracy rates of these weak classifiers.

As shown in FIG. 4(b), when the feature vector x is received, the strong classifier generated through the machine learning as described above performs weighted addition of the output values of the weak classifiers. To be more specific, when an output value of the $i^{th}$ weak classifier is z(i) and a weight corresponding to this output value is w(i), the strong classifier calculates an evaluation value Z according to the following equation.

[Math. 1]

$$Z = \sum_{i=1}^{n} w(i)z(i) \qquad (1)$$

Next, by comparing the evaluation value Z calculated in this way with a threshold value, the strong classifier determines whether or not there is a movement around a predetermined rotational axis in the positive direction. More specifically, after the completion of learning, it becomes possible for the strong classifier to predict the presence or absence of movement in the rotational direction of the predetermined axis, from the feature vector x generated based on the sensor information obtained by the sensor information obtaining unit 121 and the weight w(i) generated by the learning computer.

Each of the rotational direction classifiers is configured by such a strong classifier generated as described above. For example, the roll direction classifier 132 is configured by strong classifiers that determine the presence or absence of movements about the z axis in the positive and negative directions respectively. When both of these strong classifiers identify "no movement", the roll direction classifier 132 determines that the photographing device 100 is not moving in the roll direction.

In this way, the learning computer generates the strong classifiers using the learning data in advance in a factory or the like prior to shipment of the photographing device 100 as a product, for example. As a result, the photographing device 100 can be provided with rotational direction classifiers corresponding to the features of the photographing device 100. Here, the learning computer generates the strong classifiers that identify movements of the photographing device 100 according to the feature vector on the basis of the learning data including the feature vector generated from the sensor information and the actual movements of the photographing device 100. This is to say, the strong classifiers identify the movements of the photographing device 100, instead of movements caused between the images. This allows the rotational direction classifiers in the present embodiment to identify larger jitter with high accuracy, as compared to the case where the movements caused between the captured images are identified using learning data including the amount of characteristic or the like of the captured images.

In the above description, the learning computer generates the strong classifiers. However, the photographing device 100 may generate the strong classifiers using the learning data. In such a case, the photographing device 100 includes a learning computer. To be more specific, the photographing device 100 includes: a learning data obtaining unit which obtains learning data; and a learning unit which generates a strong classifier using the learning data obtained by the learning data obtaining unit.

Next, the processing performed by the constraint condition generating unit 130 (step S105 in FIG. 3) is described in detail.

The constraint condition generating unit 130 generates a constraint condition such that a range of a parameter value is limited when the parameter is calculated by the parameter calculating unit 140, on the basis of the movements of the photographing device 100 in the rotational directions identified by the rotational direction classifiers (the roll direction classifier 132, the pitch direction classifier 133, and the yaw direction classifier 134). Note that specific examples of the constraint condition are described later.

Next, the processing performed by the tilt angle detecting unit 141 (step S106 in FIG. 3) is described in detail.

The tilt angle detecting unit 141 calculates a tilt angle of the image with respect to the absolute horizontal or vertical, by extracting, using the Hough transform, a tilt of a line segment representing a vertical or horizontal line from the image included in the video data.

In general, according to the Hough transform, an extracted straight line y, expressed as y=ax+b (where a and b are real numbers), in an x-y coordinate space is expressed as b=−ax+y in an a-b parameter space. Then, out of points (a, b) in the a-b parameter space, a point (a0, b0) at which the largest number of straight lines intersect is extracted as a straight line parameter of the longest line segment. This being so, the tilt angle detecting unit 141 focuses on the tilt parameter a, out of the parameters a and b, and generates a histogram of the tilt parameter a in which the number of intersecting straight lines is an evaluation value. Then, the tilt angle detecting unit 141 extracts the tilt parameter a having the highest evaluation value, as the tilt of the representative line segment of the image.

Figure 5:
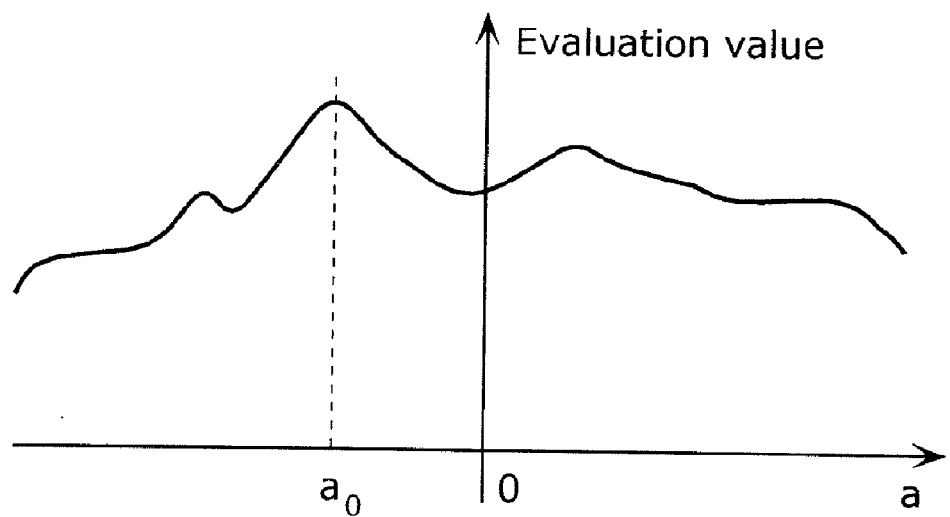

FIG. 5 is a diagram showing an example of a histogram of the tilt parameter a. In the case of the histogram shown in FIG. 5, the tilt angle detecting unit 141 extracts a=a0, where the evaluation value is the highest, as the tilt of the representative line segment of the image, that is, the tilt of an element showing the absolute horizontal or vertical. Using the extracted tilt, a tilt angle of the image with respect to the absolute horizontal or vertical is calculated. It should be noted that when the tilt angle detecting unit 141 calculates the tilt angle of the image, a tilt corresponding to ±45-degree angle serves as a boundary. For example, when the absolute value of a tilt is equal to or larger than 45 degrees, the tilt angle detecting unit 141 determines that the tilt is with respect to the absolute horizontal. Meanwhile, when the absolute value of a tilt is below 45 degrees, the tilt angle detecting unit 141 determines that the tilt is with respect to the absolute vertical. More specifically, supposing that the vertical direction in the world coordinate system is zero degrees, when the tilt is equal to or larger than 45 degrees, the tilt angle detecting unit 141 calculates the tilt angle with respect to the absolute horizontal by subtracting the present tilt from 90 degrees. On the other hand, when the tilt is below 45 degrees, the tilt angle detecting unit 141 determines the present tilt as the tilt angle with respect to the absolute vertical.

Figure 6:
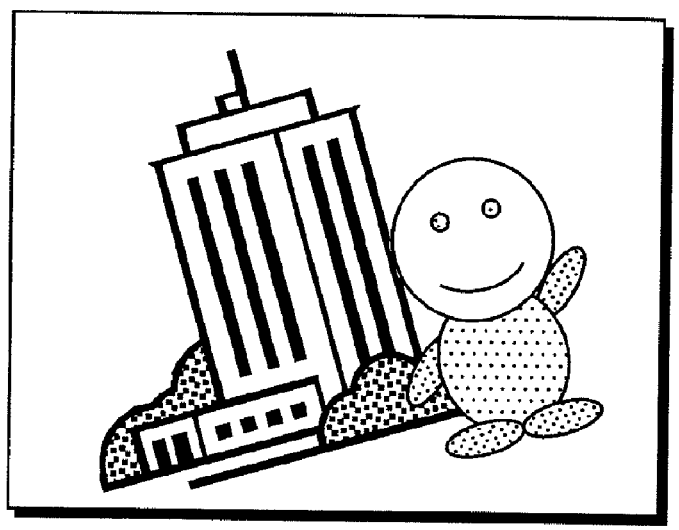
FIG. 6 is a diagram showing an example of an image included in video data obtained by an image obtainment unit.

FIG. 6 is a diagram showing an example of the image included in the video data obtained by the image obtainment unit 122. The image shown in FIG. 6 is rotating counterclockwise by 15 degrees. In this image, a vertical contour of a building shown behind a character is the longest line segment. Thus, from the tilt of this contour, the tilt angle detecting unit 141 determines 15 degrees as the tilt angle with respect to the absolute vertical. Note that when calculating the amount of rotation between the adjacent images included in the video data, the tilt angle detecting unit 141 can calculate the amount of rotation from, for example, a difference between the tilt angle of the image at the time t−1 and the tilt angle of the image at the time t.

When calculating the tilt angle as described above, the tilt angle detecting unit 141 uses a constraint condition generated by the constraint condition generating unit 130. The constraint condition used by the tilt angle detecting unit 141 is explained as follows.

When the photographing device 100 moves in the roll direction, this means the photographing device 100 rotates about the optical axis. Therefore, when image capturing is performed in a state where there is a movement in the roll direction, the captured image would rotate in a direction opposite to the roll direction of the photographing device 100. On account of this, when the roll direction classifier 132 identifies a movement in the positive direction of the roll direction, the constraint condition generating unit 130 generates a constraint condition such that a tilt angle value is limited to a negative angle value. On the other hand, when the roll direction classifier 132 identifies a movement in the negative direction of the roll direction, the constraint condition generating unit 130 generates a constraint condition such that a tilt angle value is limited to a positive angle value. Accordingly, the tilt angle detecting unit 141 can extract the tilt of the image by searching for a solution that falls only within the range where the tilt angle value is a negative or positive value.

Figure 7:
FIG. 7 is a diagram showing an example of an image included in the video data obtained by the image obtainment unit.
Figure 8:
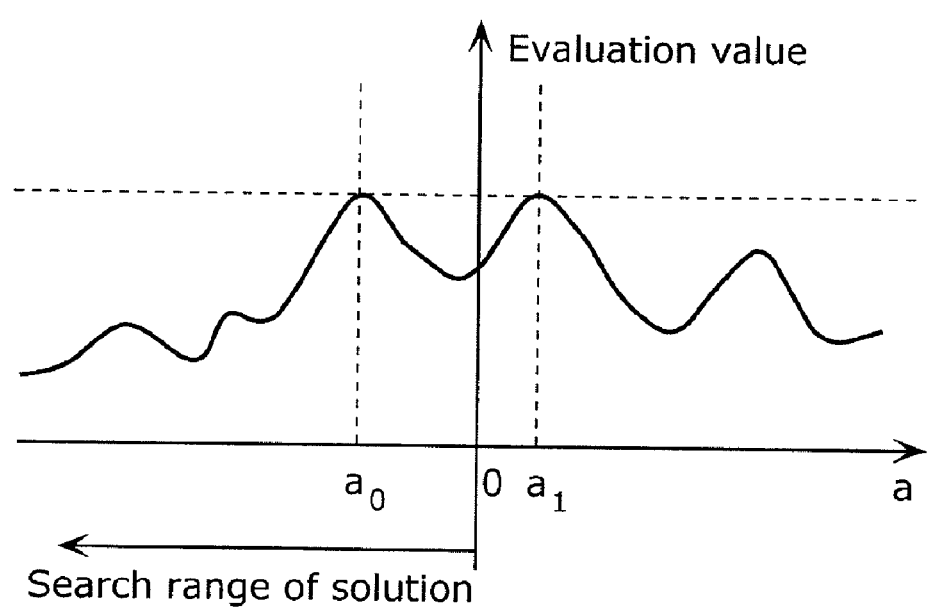
FIG. 8 is a diagram showing an example of a histogram of the tilt parameter a, the histogram being created using the image shown in FIG. 7.

A specific example is described with reference to the drawings. FIG. 7 is a diagram showing an example of the image included in the video data obtained by the image obtainment unit 122. An image shown in FIG. 7 is captured when the photographing device 100 rotates in the positive direction (clockwise) of the roll direction. For this reason, the captured image rotates in the counterclockwise direction. FIG. 8 is a diagram showing an example of a histogram of the tilt parameter a, the histogram being created using the image shown in FIG. 7. In the histogram shown in FIG. 8, the evaluation value of a0 is approximately identical to that of a1. In the case where there is no constraint condition, the tilt angle detecting unit 141 extracts the tilt having the highest evaluation value, as the tilt with respect to the absolute horizontal or vertical. However, considering operation errors or the like caused in the line segment extraction processing, simply extracting the tilt having the highest evaluation value leads the tilt angle detecting unit 141 to extract an incorrect tilt in the case where the difference between the evaluation values is minute. To address this problem, using the constraint condition under which the tilt is limited to be within the range where a tilt angle value of the image is a negative value, the tilt angle detecting unit 141 limits the range of a solution to a range expressed as a>0 in the histogram shown in FIG. 8. In this way, since the range of a solution is limited using the constraint condition, the tilt angle detecting unit 141 extracts a1 as the tilt with respect to the absolute horizontal or vertical. In other words, the tilt angle detecting unit 141 does not extract a0 as the tilt with respect to the absolute horizontal or vertical. Accordingly, by limiting the range of a solution using the constraint condition generated by the constraint condition generating unit 130, the tilt angle detecting unit 141 can improve the accuracy of a solution to be determined by calculation. Moreover, when searching for the tilt having the highest evaluation value, the tilt angle detecting unit 141 searches only the solution range determined by the constraint condition. This allows operation cost to be reduced.

Next, the processing performed by the jitter detecting unit 142 (step S107 in FIG. 3) is described in detail.

The jitter detecting unit 142 is a processing unit which detects movements existing between the adjacent images, and mainly detects the amount of translation. To be more specific, the jitter detecting unit 142 extracts respective feature points from the adjacent images included in the obtained video data. By performing matching on the extracted feature points between the adjacent images, the jitter detecting unit 142 obtains the amount of translation which occurs between the positions of the feature points that are supposed to coincide with each other.

Figure 9A:
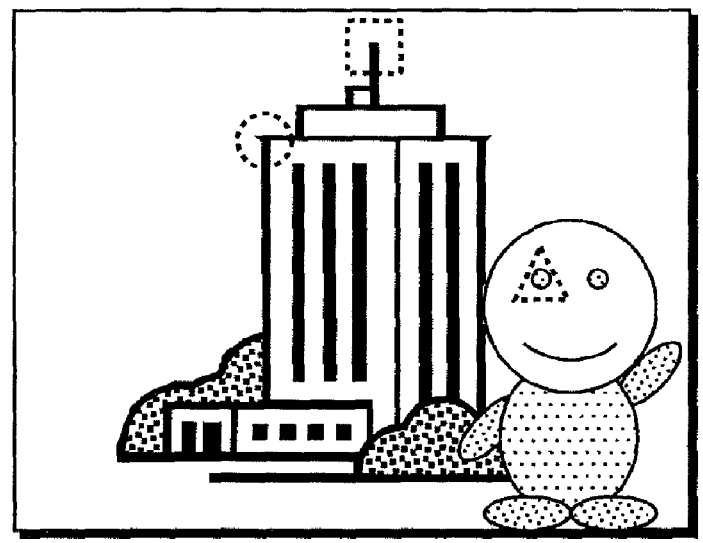
FIG. 9A is a diagram showing an example of an image captured at a time t−1.
Figure 9B:
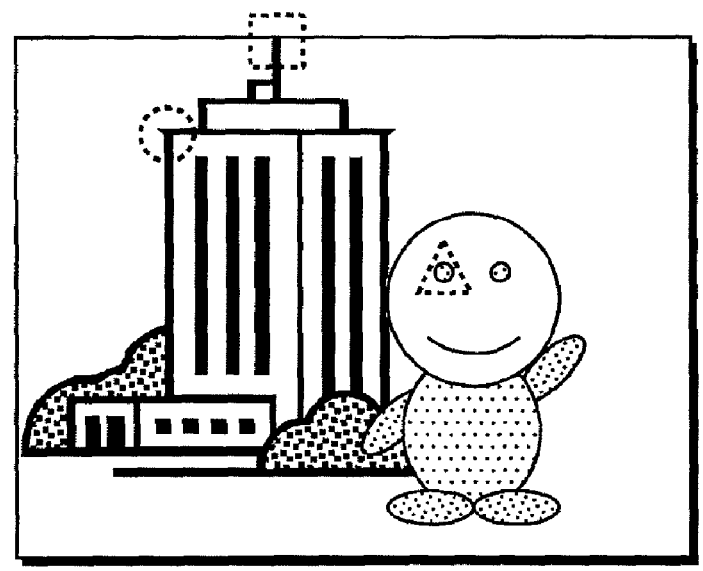
FIG. 9B is a diagram showing an example of an image captured at a time t.

FIGS. 9A and 9B are diagrams for explaining the amount of translation between the images captured at the time t−1 and the time t. More specifically, FIG. 9A is a diagram showing an example of the image captured at the time t−1, whereas FIG. 9B is a diagram showing an example of the image captured at the time t.

The jitter detecting unit 142 first extracts the feature points respectively from the two images which are temporally adjacent. Although there are various methods of extracting feature points, it is not necessary to particularly limit the method that is employed by the jitter detecting unit 142 for extracting the feature points. More specifically, the jitter detecting unit 142 may extract the feature points using a common method whereby an edge or a corner found out from a change in luminance or color of the image is extracted. Or, the jitter detecting unit 142 may employ another method to extract the feature points. With this being the situation, the detailed description of how the feature points are extracted is omitted here. In FIGS. 9A and 9B, each of symbols indicated with open circles, open triangles, and open rectangles is a feature point extracted by the jitter detecting unit 142. Here, the symbols in the same shape are the feature points corresponding to each other between the two images.

Next, the jitter detecting unit 142 performs feature-point matching. To be more specific, the jitter detecting unit 142 sets a template around each feature point of the image which is captured at the time t−1 and which is used as a standard (this image is referred to as the standard image). Similarly, the jitter detecting unit 142 sets a template around each feature point of the image captured at the time t (this image is referred to as the reference image). Then, by performing template matching on all varying combinations of feature points, the jitter detecting unit 142 determines a correspondence relation of the feature points between the standard image and the reference image. More specifically, the jitter detecting unit 142 determines a correspondence relation of the feature points between the two images, on the basis, for example, that the template around the feature point indicated with the open triangle in the image captured at the time t−1 has a higher correlation to the template around the feature point indicated with the open triangle in the image captured at the time t than to the templates around the feature points indicated with the open circle and the open rectangle in the image captured at the time t. Following this, the jitter detecting unit 142 calculates the amount of translation between the standard image and the reference image using the determined correspondence relation of the feature points.

Figure 10:
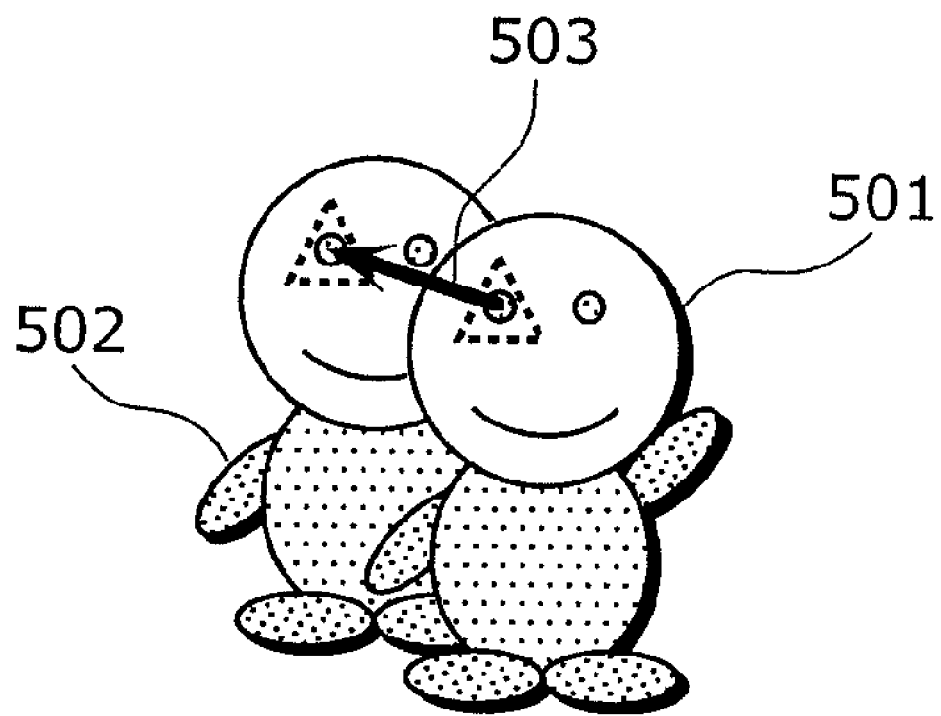
FIG. 10 is a diagram for explaining the amount of translation calculated through feature-point matching.

FIG. 10 is a diagram for explaining the amount of translation calculated through the feature-point matching. In FIG. 10, areas showing character images captured at the time t−1 and the time t are overlapped. A character image 501 is contained in the image captured at the time t−1. A character image 502 is contained in the image captured at the time t. It should be noted that the character images 501 and 502 shown here are obtained by superimposing the frames of the images captured at the respective times. A motion vector 503 is a vector from the feature point indicated with the open triangle at the time t−1 to the feature point indicated with the open triangle at the time t. Here, suppose that elements of the motion vector in the horizontal and vertical directions are $\Delta x$ and $\Delta y$ respectively. In this case, by translating the entire image captured at the time t by $-\Delta x$ in the horizontal direction and by $-\Delta y$ in the vertical direction, the feature points of the images captured at the times t−1 and t can coincide with each other. According to the method as described, the displacements occurring to the two images can be corrected using the amount of translation calculated by the jitter detecting unit 142.

When calculating the amount of translation as described above, the jitter detecting unit 142 in the present embodiment uses the constraint condition generated by the constraint condition generating unit 130. The constraint condition used by the jitter detecting unit 142 is explained as follows, with reference to the drawings.

Figure 11A:
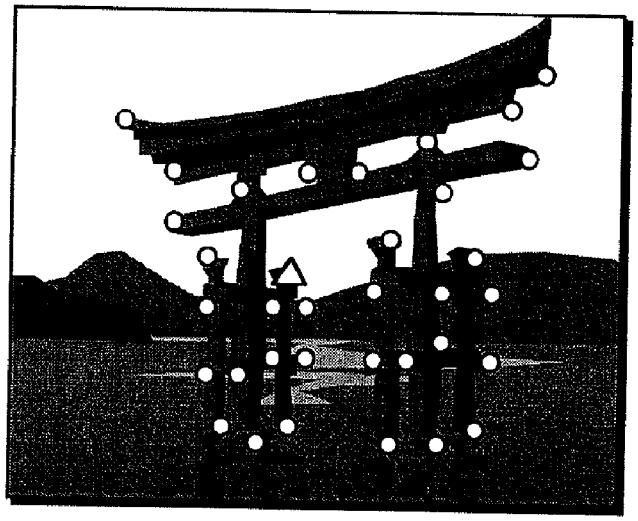
FIG. 11A is a diagram showing an example of an image captured by the photographing device at a time t−1.
Figure 11B:
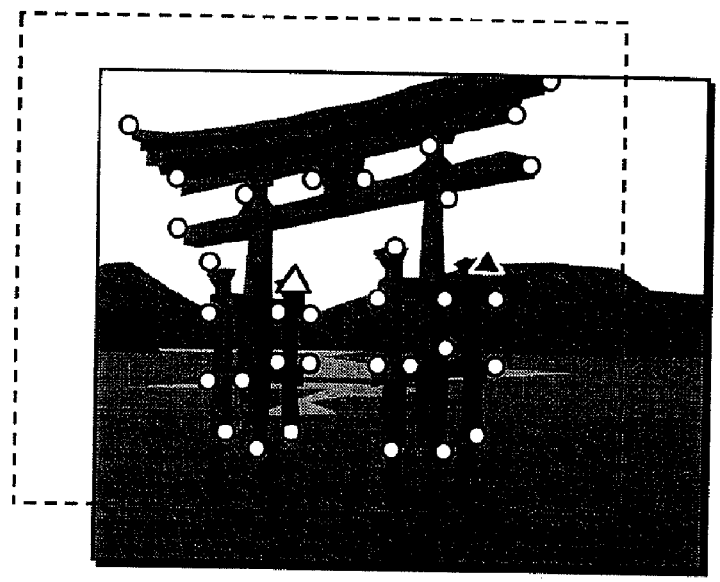
FIG. 11B is a diagram showing an example of an image captured by the photographing device at a time t.

FIG. 11A is a diagram showing an example of an image captured by the photographing device 100 at a time t−1. FIG. 11B is a diagram showing an example of an image captured by the photographing device 100 at a time t. An area enclosed with a broken line in FIG. 11B corresponds to a frame of the image shown in FIG. 11A. This is to say, the image frame shown in FIG. 11B shifts to the lower right direction with respect to the image frame shown in FIG. 11A. In FIGS. 11A and 11B, each of open circles, open triangles, and a filled-in triangle plotted on the images is a feature point of the corresponding image. The feature points shown in FIG. 11B shift to the upper left direction with respect to the corresponding feature points shown in FIG. 11A, as a result of the shift of the image frame.

Figure 12A:
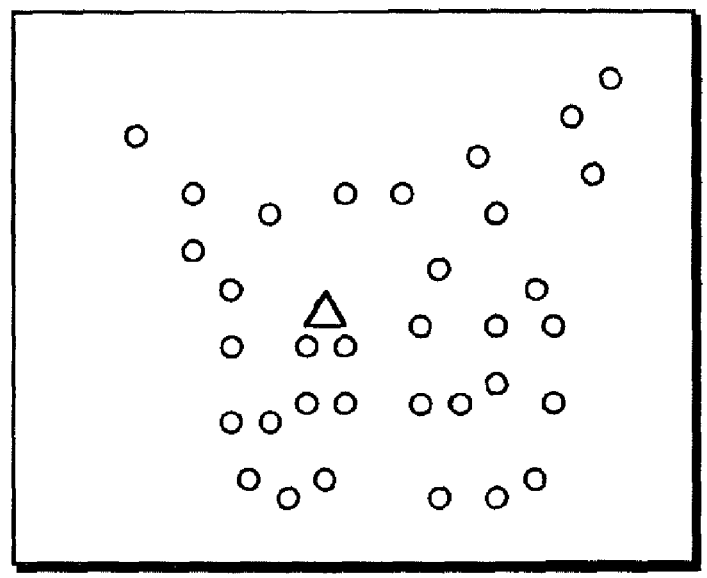
FIG. 12A is a diagram showing feature points extracted from the diagram shown in FIG. 11A.
Figure 12B:
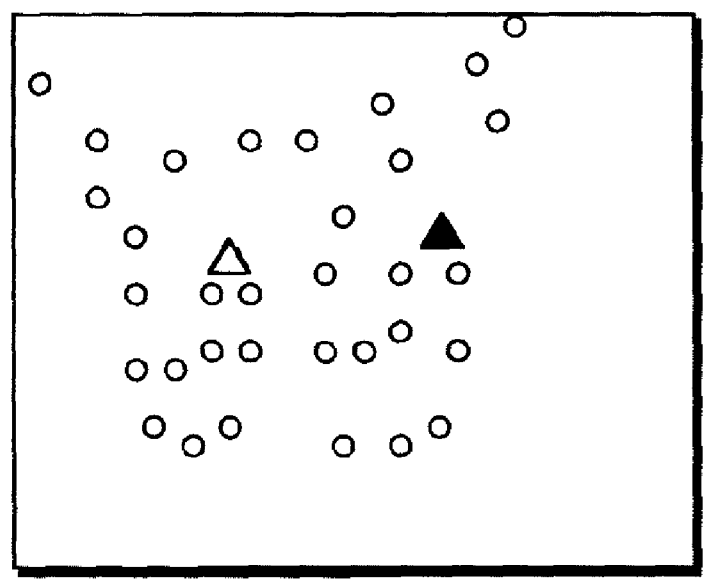
FIG. 12B is a diagram showing feature points extracted from the diagram shown in FIG. 11B.

FIGS. 12A and 12B are diagrams showing the feature points extracted respectively from the feature points shown in FIGS. 11A and 11B. Here, when extracting the feature points shown in FIGS. 12A and 12B, the jitter detecting unit 142 calculates the amount of translation through the feature-point matching as described above. To be more specific, according to the template matching method or the like, the jitter detecting unit 142 finds out a feature point in FIG. 12B that corresponds to the feature point indicated with the open triangle in FIG. 12A.

Figure 12C:
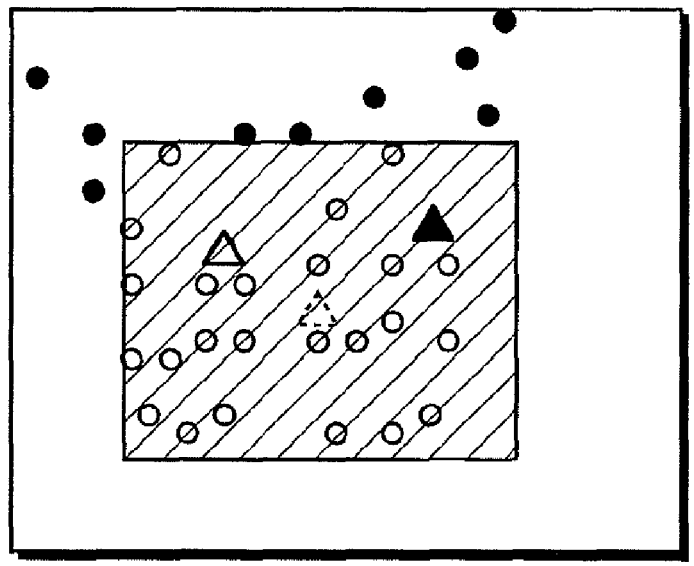
FIG. 12C is a diagram showing a search area in the case where a jitter detecting unit performs template matching for a feature point indicated with an open triangle in FIG. 12A, without using a constraint condition.

FIG. 12C is a diagram showing a search area in the case where the jitter detecting unit 142 performs template matching for the feature point indicated with the open triangle in FIG. 12A, without using a constraint condition. As shown in FIG. 12C, when a constraint condition generated by the constraint condition generating unit 130 is not used, the jitter detecting unit 142 performs matching processing on the feature points (the open circles, open triangle, and filled-in triangle) included in a diagonally shaded area. Thus, the jitter detecting unit 142 does not perform the matching processing on the feature points indicated with filled-in circles located outside the diagonally shaded area. Here, the search area indicated by the diagonally shaded area is a rectangular area having coordinates, as a center (at a location shown by a broken-line open triangle in FIG. 12C), that are identical to those of the corresponding feature point indicated with the open triangle in the image shown in FIG. 12A. Here, the arrangements of feature-point groups respectively corresponding to two legs (which are approximately the same in structure) of the shrine gate of the image in FIG. 11A resemble the arrangements shown in FIG. 11B. This means that templates set around these feature points also resemble each other. As a consequence of this, the jitter detecting unit 142 may end up performing incorrect matching processing according to the template matching. To be more specific, there is a risk that the jitter detecting unit 142 may incorrectly determine that the feature point indicated with the open triangle in FIG. 12A corresponds to the feature point indicated with the filled-in triangle in FIG. 12C.

To address the risk, the jitter detecting unit 142 performs template matching using a constraint condition generated by the constraint condition generating unit 130. More specifically, the constraint condition generating unit 130 generates a constraint condition such that a search area in which template matching is performed is limited, on the basis of characteristics that movements occurring to the photographing device 100 in the pitch and yaw directions are reflected on the image as the translations in the vertical and horizontal directions respectively.

For example, suppose that, using the sensor information that is obtained when the image shown in FIG. 11B is captured, the pitch direction classifier 133 and the yaw direction classifier 134 respectively identify that the pitch direction is in the positive direction and that the yaw direction is in the negative direction (meaning that the optical axis of the photographing device is facing in the lower right direction). In this case, the constraint condition generating unit 130 generates a constraint condition such that a search area for template matching in the reference image is located at the upper left with respect to the coordinates identical to those of the corresponding feature point that is a subject of matching in the standard image. More specifically, when the jitter detecting unit 142 searches for the feature point that corresponds to the open triangle of FIG. 12A out of the feature points shown in FIG. 12B, the constraint condition generating unit 130 generates a constraint condition such that the fitter detecting unit 142 searches an area located at the upper left with respect to the coordinates identical to those of the corresponding feature point indicated with the open triangle in FIG. 12A.

This is to say, when the pitch direction classifier 133 identifies a movement in the positive direction of the pitch direction, the constraint condition generating unit 130 generates a constraint condition such that feature points in an area located at the upper side of the coordinates identical to those of the corresponding feature point in the standard image are subjects of matching. On the other hand, when the pitch direction classifier 133 identifies a movement in the negative direction of the pitch direction, the constraint condition generating unit 130 generates a constraint condition such that feature points in an area located at the lower side of the coordinates identical to those of the corresponding feature point in the standard image are subjects of matching.

Moreover, when the yaw direction classifier 134 identifies a movement in the positive direction of the yaw direction, the constraint condition generating unit 130 generates a constraint condition such that feature points in an area located at the right side of the coordinates identical to those of the corresponding feature point in the standard image are subjects of matching. On the other hand, when the yaw direction classifier 134 identifies a movement in the negative direction of the yaw direction, the constraint condition generating unit 130 generates a constraint condition such that feature points in an area located at the left side of the coordinates identical to those of the corresponding feature point in the standard image are subjects of matching.

Figure 12D:
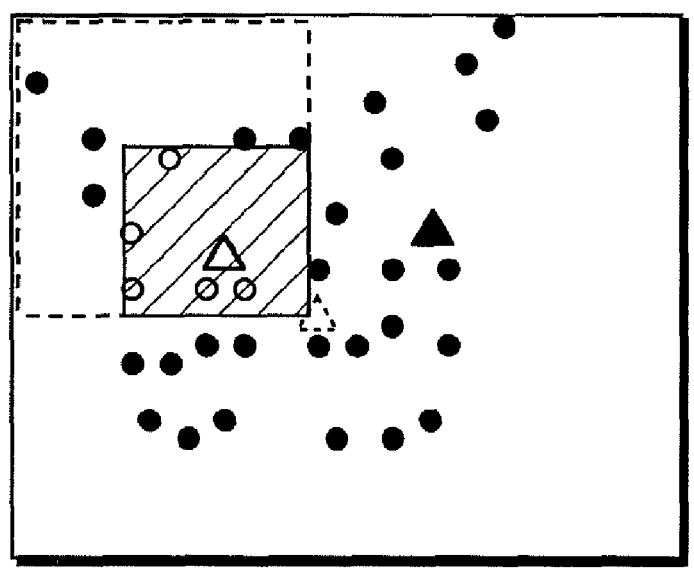
FIG. 12D is a diagram showing a search area in the case where the jitter detecting unit performs template matching for the feature point indicated with the open triangle in FIG. 12A, using the constraint condition.

FIG. 12D is a diagram showing a search area in the case where the jitter detecting unit 142 performs template matching for the feature point indicated with the open triangle in FIG. 12A, using the constraint condition. Using the constraint condition, the jitter detecting unit 142 performs template matching only on a diagonally shaded area shown in FIG. 12D. As a result, since the feature point indicated with a filled-in triangle shown in FIG. 12D is not a subject of the template matching, the jitter detecting unit 142 does not determine that the feature point indicated with the open triangle in FIG. 12A corresponds to the feature point indicated with the filled-in triangle. That is, by using the constraint condition, the risk that the jitter detecting unit 142 may perform incorrect matching can be reduced. Moreover, the number of feature points which are to be subjects of the template matching can be reduced, thereby reducing an operation load on the jitter detecting unit 142.

Next, the processing performed by the image correcting unit 150 (step S108 in FIG. 3) is explained in detail. Using the tilt angle calculated by the parameter calculating unit 140 and the amount of translation, the image correcting unit 150 performs alignment between the standard image and the reference image. The detailed explanation is given as follows.

Suppose that the tilt angle calculated by the tilt angle detecting unit 141 is $\theta$ and that the motion vector detected by the jitter detecting unit 142 is $(\Delta x, \Delta y)$. In this case, the image captured at the time t is rotated by $\theta$ with respect to the image captured at the time t−1. Moreover, the image captured at the time t is translated by $\Delta x$ in the horizontal direction and by $\Delta y$ in the vertical direction, with respect to the image captured at the time t−1.

This being so, the image correcting unit 150 rotates the image captured at the time t by $-\theta$, and also translates this image by $-\Delta x$ in the horizontal direction and by $-\Delta y$ in the vertical direction. As a result, displacements between the images captured respectively at the times t and t−1 can be corrected. The image correcting unit 150 performs this alignment using an affine transformation. To be more specific, the image correcting unit 150 corrects the image captured at the time t, using the following equation (2) where post-correction coordinates are (x, y), pre-correction coordinates are (x0, y0), and an affine matrix with 3 rows and 3 columns is R.

[Math. 2]

$$p = R \cdot p0 \quad (2)$$

where $$p0 = \begin{pmatrix} x0 \\ y0 \\ 1 \end{pmatrix},$$

$$p = \begin{pmatrix} x \\ y \\ 1 \end{pmatrix},$$

$$R = \begin{pmatrix} \cos(-\theta) & \sin(-\theta) & \Delta x \\ -\sin(-\theta) & \cos(-\theta) & \Delta y \\ 0 & 0 & 1 \end{pmatrix}$$

Here, when the post-correction coordinates calculated from the pre-correction coordinates deviate from a frame of the image, the image correcting unit 150 abandons the image information of the pre-correction coordinates. Moreover, when the pre-correction coordinates necessary to obtain the post-correction coordinates deviate from the frame of the image, the image correcting unit 150 cannot obtain image information of the post-correction coordinates. For this reason, there may be a case where the image obtained after the correction performed by the image correcting unit 150 has an area in which no image information is present.

Figure 13:
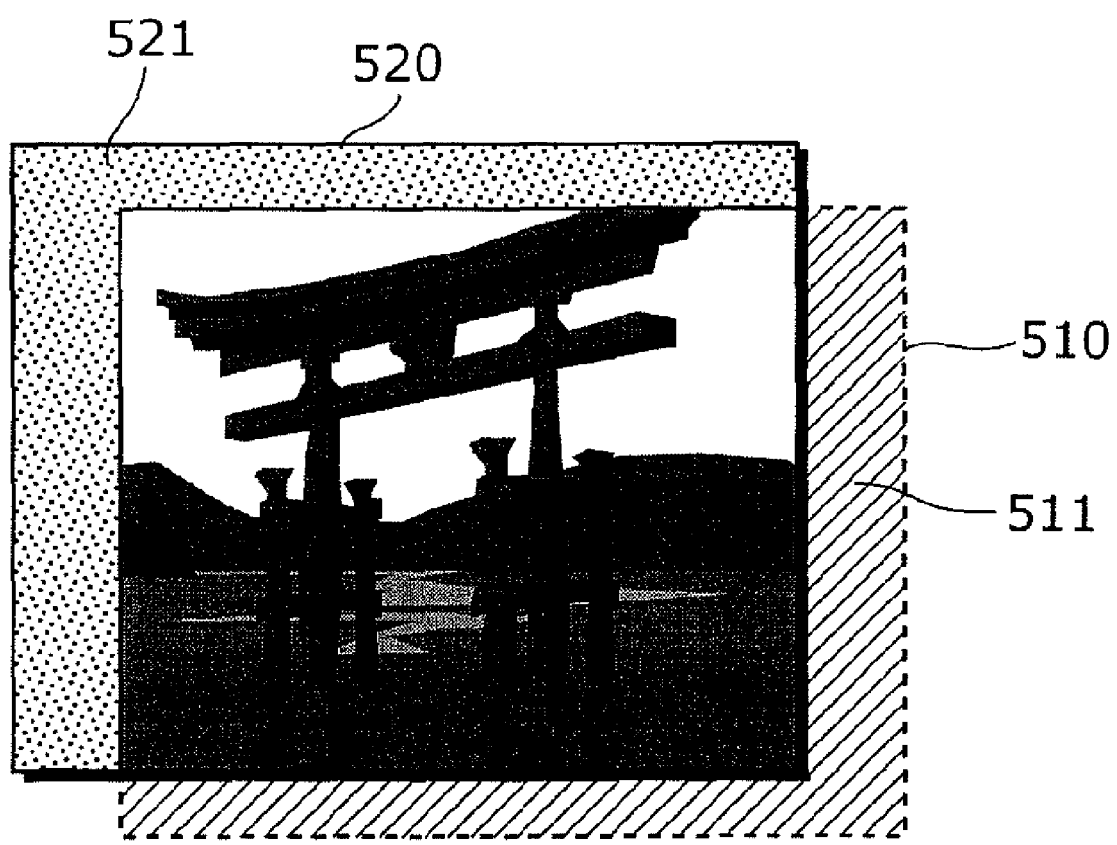
FIG. 13 is a diagram showing an example of an image obtained as a result of the correction performed by an image correcting unit on the image shown in FIG. 11B.

FIG. 13 is a diagram showing an example of an image obtained as a result of the correction performed on the image shown in FIG. 11B by the image correcting unit 150. A rectangular area 510 indicates a frame of the image before the correction. A rectangular area 520 indicates a frame of the image after the correction. Here, an area 521 in the left and upper parts of the rectangular area 520 indicates an area whose image information is not held in the pre-correction image. An area 511 in the right and lower parts of the rectangular area 510 indicates an area whose image information is abandoned, out of the frame of the pre-correction image shown in FIG. 11B, when alignment is performed.

As described so far, the photographing device 100 in the present embodiment performs alignment on the images which are temporally adjacent. In doing so, the photographing device 100 performs alignment on a plurality of images included in the video data. Therefore, even when movements occur to the photographing device 100, the video data can be corrected so that these movements are not reflected to the video data.

Moreover, using a plurality of sensors having different characteristics (the acceleration sensor and the angular velocity sensor in the present embodiment), movements occurring to the photographing device 100 can be identified. This allows the robustness in the motion identification to be improved. Furthermore, the photographing device 100 can associate the behaviors of the sensors (namely, the feature vector) with the actual movements of the photographing device 100 in advance, according to the learning method such as AdaBoost. On this account, even when cross-axis sensitivity, inertial noise, or the like is superimposed on output values of the sensors, movements of the photographing device 100 can be identified with stability. Then, the photographing device 100 can calculate parameters using the constraint conditions generated on the basis of such identified movements of the photographing device 100. Therefore, the parameters can be calculated with accuracy.

Also, the photographing device 100 can calculate a tilt of an image as a parameter. Thus, a parameter used for correcting jitter in a rotational element that is a major contributor to video jitter can be calculated.

Second Embodiment

Next, a photographing device in the second embodiment of the present invention is described.

Figure 14:
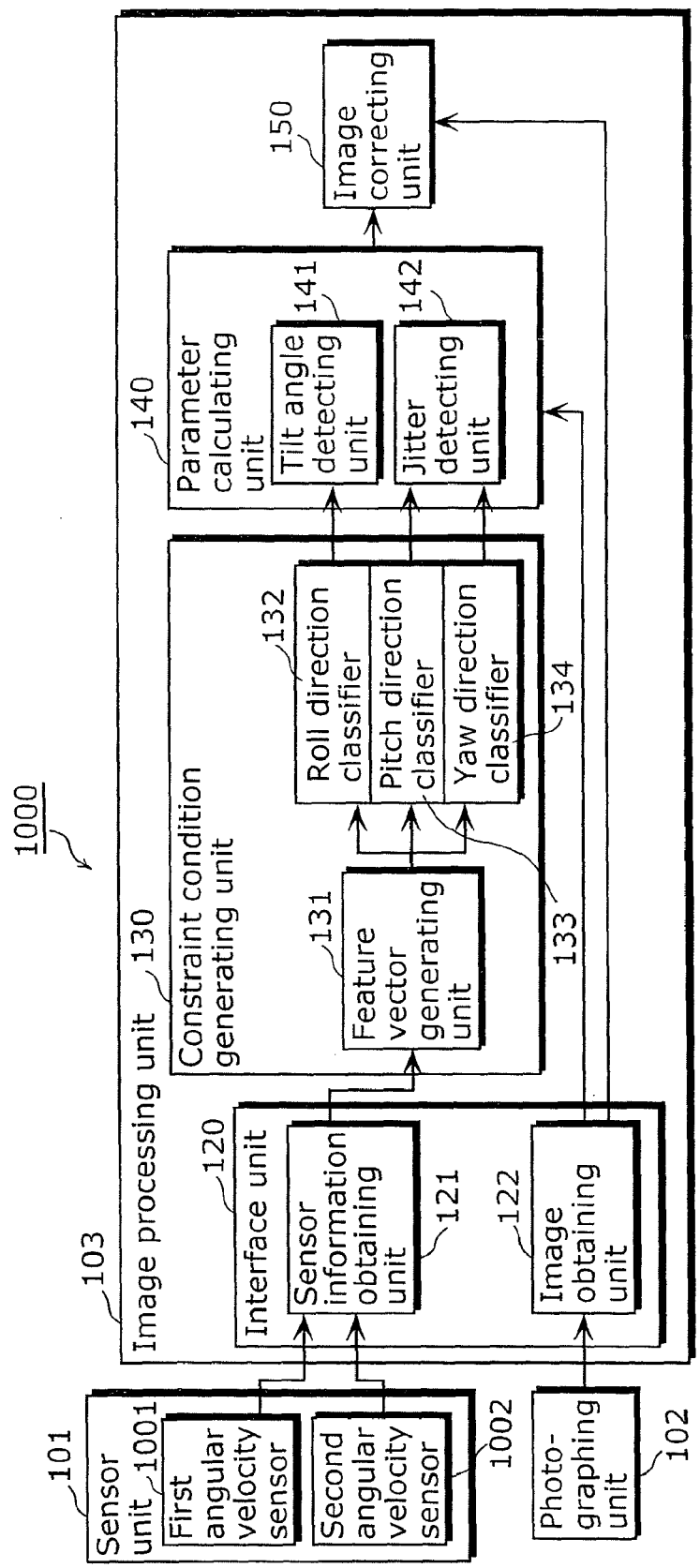
FIG. 14 is a diagram showing a function configuration of a photographing device in a second embodiment of the present invention.

FIG. 14 is a diagram showing a function configuration of a photographing device 1000 in the second embodiment of the present invention. The photographing device 1000 in the present embodiment is different from the photographing device 100 in the first embodiment in that the sensor unit 101 has two angular velocity sensors. Note that components which are the same as those in the first embodiment are assigned the same reference numerals as used in the first embodiment and, thus, the explanation of these components is omitted.

Each of a first angular velocity sensor 1001 and a second angular velocity sensor 1002 is an angular velocity sensor which measures angular velocities around three axes orthogonal to one another, and is a sensor which measures movements of the photographing device 1000. Here, the first angular velocity sensor 1001 and the second angular velocity sensor 1002 are set in the photographing device 1000 in such a manner that their measurement axes do not coincide with one another.

Figure 15:
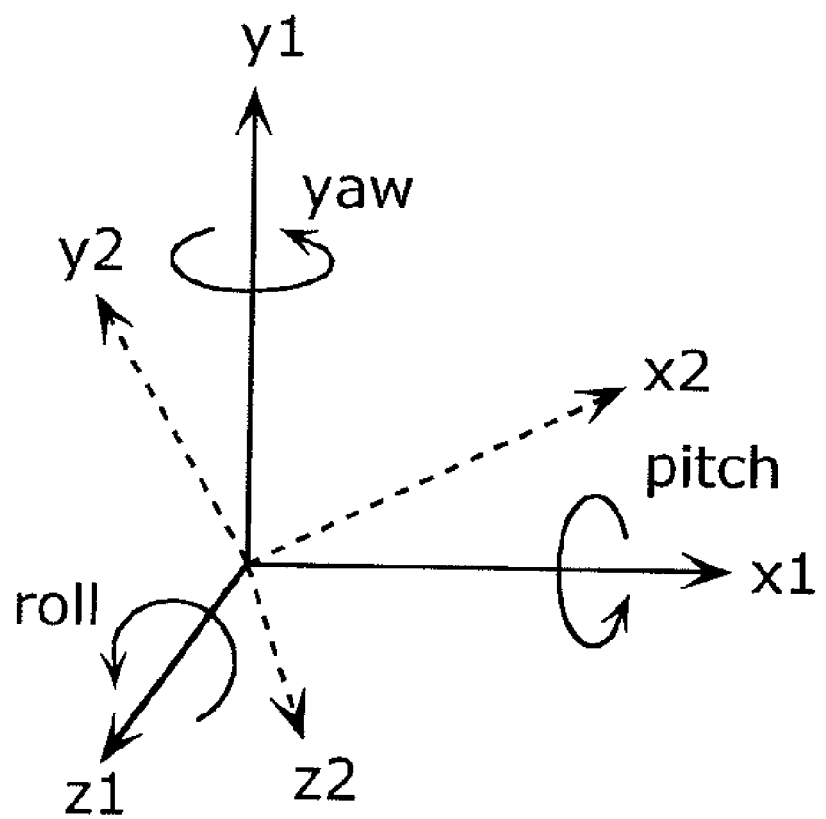
FIG. 15 is a diagram showing an example of measurement axes of a first angular velocity sensor and a second angular velocity sensor.

FIG. 15 is a diagram showing an example of measurement axes of the first angular velocity sensor 1001 and the second angular velocity sensor 1002. The first angular velocity sensor 1001 detects angular velocities around an x1 axis, a y1 axis, and a z1 axis which are orthogonal to one another. Meanwhile, the second angular velocity sensor 1002 detects angular velocities around an x2 axis, a y2 axis, and a z3 axis which are orthogonal to one another. For example, when a rotational movement is applied only around the z1 axis, no rotational movements occur around the x1 and y1 axes. Thus, the first angular velocity sensor 1001 outputs 0 as sensor information of the x1 and y1 axes (in actuality, some sort of output is provided due to the cross-axis sensitivity). However, the movement around the z1 axis can be decomposed into movements around the x2, y2, and z2 axes. On account of this, the second angular velocity sensor 1002 outputs values other than 0 as sensor information of the x2, y2, and z2 axes, with respect to the rotational movement around the z1 axis. This is to say, the photographing device 1000 can obtain information that is derived by observing the rotational movement around the z1 axis from a different point view.

As described so far, the photographing device 1000 generates a feature vector using the sensor information obtained through the measurements made by the sensor unit 101, as is the case with the photographing device 100 in the first embodiment. Using this feature vector, the photographing device 1000 identifies rotational directions of the three axes when movements occur to the photographing device 1000. Here, with the first angular velocity sensor and the second angular velocity sensor having the different measurement axes as shown in FIG. 15, the photographing device 1000 in the present embodiment can increase redundancy of information that is used when movements occurring to the photographing device 1000 are identified. Such an increase in redundancy leads to an improvement in accuracy for each of the rotational direction classifiers. In other words, by observing movements occurring to the photographing device 1000 from a plurality of points of view, the photographing device 1000 can significantly improve the system stability and the usefulness of constraint conditions used in the parameter calculations.

The present embodiment has described the photographing device 1000 including two angular velocity sensors which are set in such a manner that their measurement axes do not coincide with one another. Note that angular velocity sensors of the photographing device 1000 in the present invention are not limited to such angular velocity sensors. To be more specific, the photographing device of the present invention may include a plurality of angular velocity sensors which are different from one another in at least one of: installation location, measurement direction, response frequency, and sensitivity characteristics (such as sensitivity, sensitivity deviation, sensitivity drift, and cross-axis sensitivity).

For example, suppose that the photographing device includes two angular velocity sensors which are installed at different locations (for instance, one is installed at a barycentric position of the photographing device while the other is installed away from the barycentric position). In this case, with respect to movements occurring to the photographing device, moments of inertia differ from each other at the locations where these angular velocity sensors are installed. Accordingly, output values of the angular velocity sensors are different from each other.

Moreover, for example, suppose that the photographing device includes two angular velocity sensors which have different response speeds. In this case too, output values of the angular velocity sensors are different from each other. This is because one angular velocity sensor mainly detects instantaneous movements (at a high frequency) while the other angular velocity sensor mainly detects slower movements (at a low frequency). That is, having such two angular velocity sensors with different response speeds means that the photographing device observes movements occurring to the photographing device from different points of view in terms of operating frequency.

As described above, the different installation locations or different response speeds of the two angular velocity sensors are conducive to an improvement in redundancy that is necessary when a movement occurring to the photographing device is detected, thereby contributing to improvements in the usefulness of constraint conditions and in the system stability.

In the present embodiment, the photographing device 1000 including two angular velocity sensors has been explained. Note that sensors included in the photographing device 1000 of the present invention are not limited to such angular velocity sensors. To be more specific, the photographing device of the present invention may include a plurality of sensors, such as an acceleration sensor and an orientation sensor, which can detect movements occurring to the photographing device. This is to say, using a combination of sensors which are different from one another in at least either the installation method or sensor characteristics, the same effects can be produced as in the case of the photographing device 1000 in the present embodiment.

Third Embodiment

Next, a photographing device in the third embodiment of the present invention is described.

Figure 16:
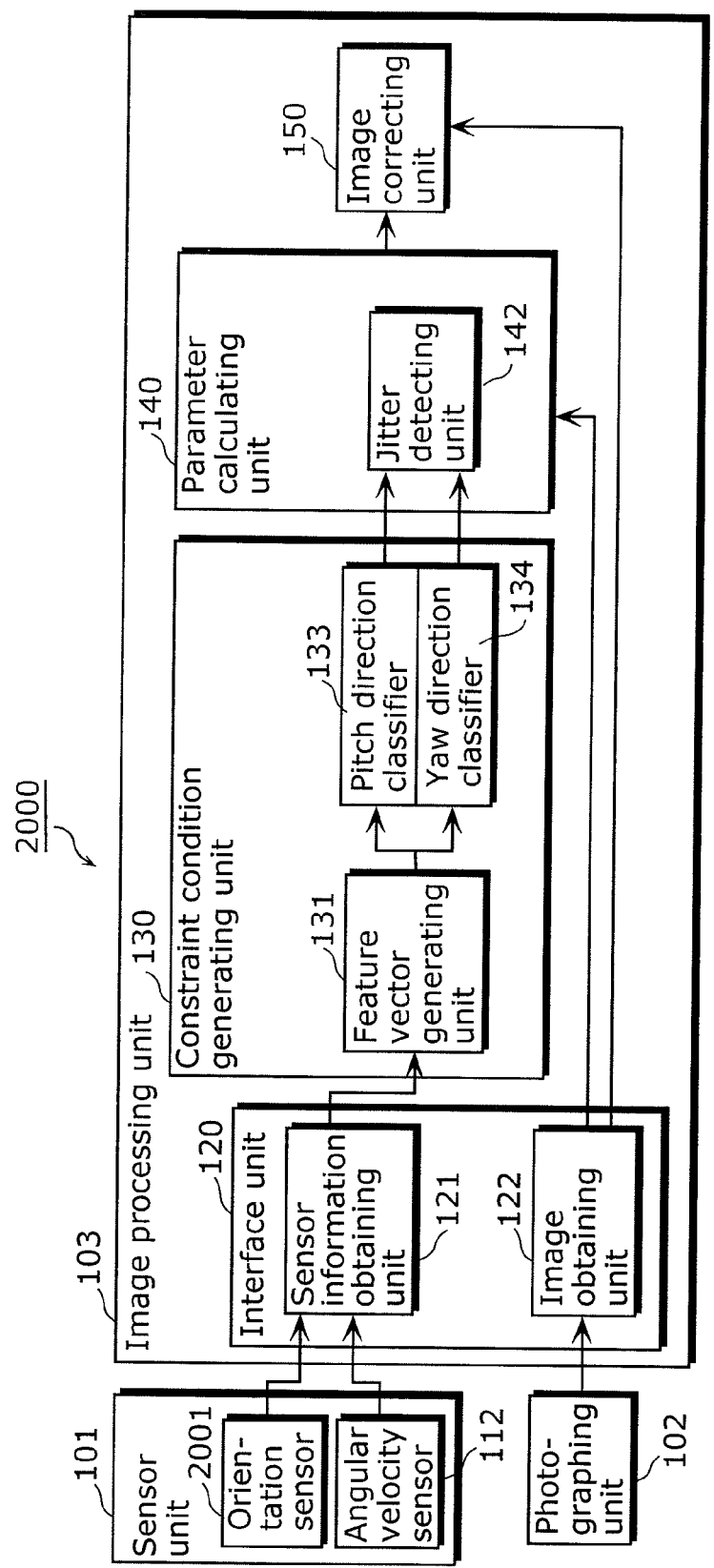
FIG. 16 is a diagram showing a function configuration of a photographing device in a third embodiment of the present invention.

FIG. 16 is a diagram showing a function configuration of a photographing device 2000 in the third embodiment of the present invention. The photographing device 2000 is an in-vehicle photographing device in which a straight-ahead direction of an automobile coincides with an optical axis direction of the photographing device 2000. This is to say, in the case of the photographing device 2000, rotational displacements in the captured video data, namely, motion elements in the roll direction, are minute. When the motion elements are averaged through time, they can be approximated as "no change".

On account of this, it can be said that it is only parallel displacements that exist in images captured by the photographing device 2000. Thus, the photographing device 2000 in the present embodiment is different from the photographing device 100 in the first embodiment in that a roll direction classifier and a tilt angle detecting unit are not provided. Note that components which are the same as those in the first embodiment are assigned the same reference numerals as used in the first embodiment and, thus, the explanation of these components is omitted.

An orientation sensor 2001 is a sensor that determines an orientation. Since it can be said that an automobile moves almost only on a plane surface, the orientation sensor 2001 is set in order to complement the information from the angular velocity sensor 112 that obtains measurements in the yaw direction.

As is the case with the first embodiment, the sensor information obtained from the sensor unit 101 provided in this way and the movements of the photographing device 2000 (the movements of the automobile) are learned in advance, and are accordingly associated with each other. With this, a movement in the yaw direction can be identified on the basis of the sensor information. As a result, the parameter calculating unit 140 can improve its processing performance (the amount of operation and the operation accuracy).

It should be noted here that the photographing device 2000 in the present embodiment may further include a vehicle speed sensor and a curve identifier of the automobile. In such a case, the feature vector generating unit 131 can generate a feature vector using the sensor information from the vehicle speed sensor, the orientation sensor, and the angular velocity sensor. By learning, in advance, the generated feature vector and an actual state where the automobile is about to take a curve, the photographing device 2000 may further include the curve identifier that identifies the state where the automobile is about to take a curve. When the automobile is about to take a curve, video data captured by the photographing unit 102 will have a great amount of horizontal motion blur. This means that there is no point to perform alignment between images included in the video data. On this account, when the curve identifier identifies a state where the automobile is about to take a curve, the parameter calculating unit 140 and the image correcting unit 150 respectively stop the parameter calculation processing and the image alignment processing. After the automobile finishes the curve and starts going straight in a constant direction again, the alignment processing can be restarted as well. In this way, the curve identifier can serve as a switch which instructs the parameter calculating unit 140 and the image correcting unit 150 to start or stop their corresponding processing.

As described, a condition under which the parameter calculating unit 140 and the image correcting unit 150 execute their processing is limited. This allows the photographing device 2000 in the present embodiment to further reduce the operation cost and to perform video jitter correction more appropriately according to the circumstances.

Fourth Embodiment

Next, a photographing device in the fourth embodiment of the present invention is described.

Figure 17:
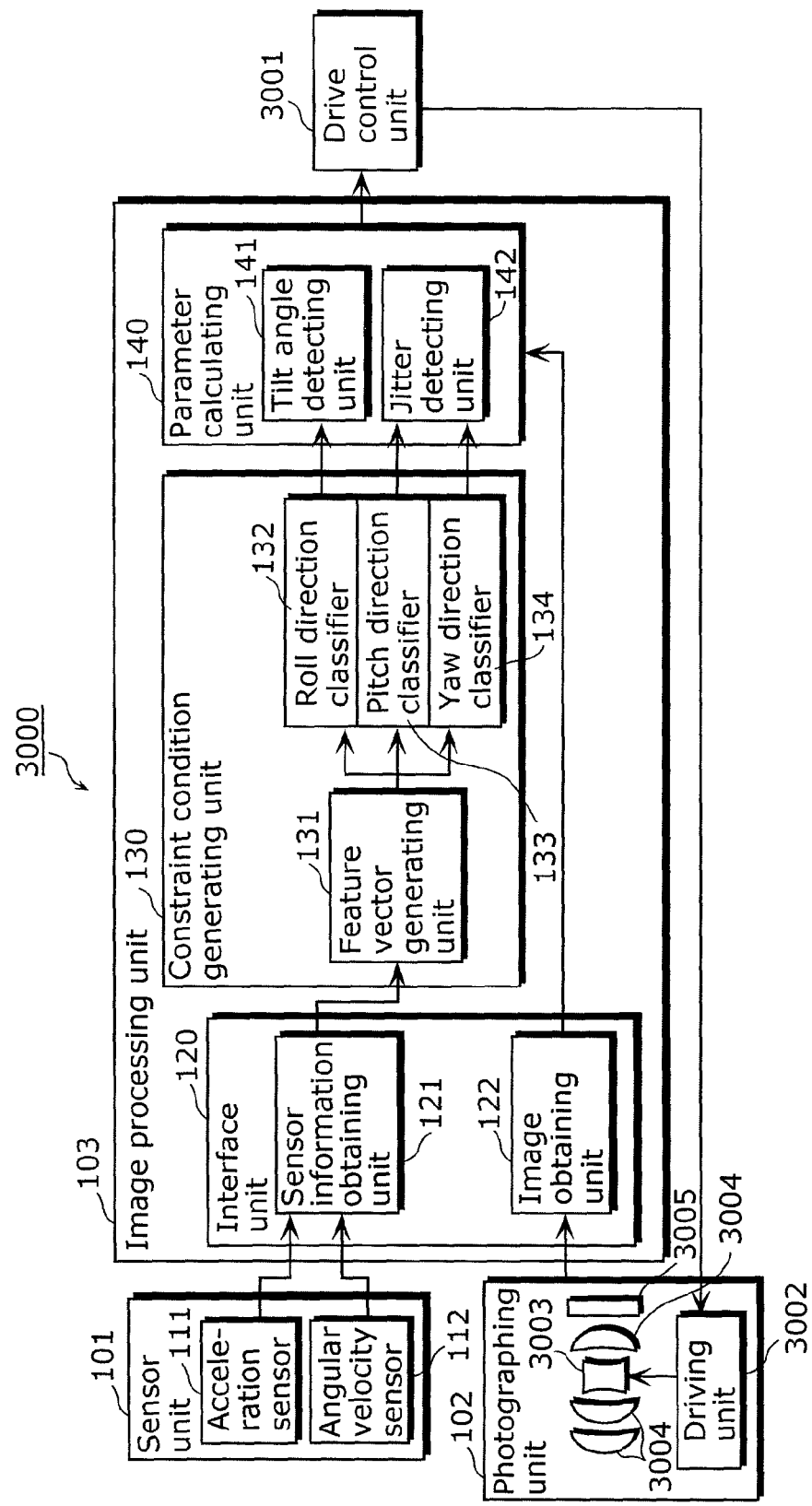
FIG. 17 is a diagram showing a function configuration of a photographing device in a fourth embodiment of the present invention.

FIG. 17 is a diagram showing a function configuration of a photographing device 3000 in the fourth embodiment of the present invention. As shown in FIG. 17, the photographing device 3000 in the present embodiment is different from the photographing device 100 in the first embodiment in that the photographing unit 102 has a driving unit 3002 and an active prism 3003 and in that a drive control unit 3001 is provided in place of the image correcting unit. The rest of the components are the same as those included in the photographing device 100 in the first embodiment and, thus, the explanation of these components is omitted.

The drive control unit 3001 converts parameters calculated by the parameter calculating unit 140 (i.e., the tilt angle and the motion vector) into the amounts of rotation about the three axes using parameters unique to the photographing unit 102, according to a predetermined method. The amounts of rotation obtained by the conversion are the amounts of rotation actually occurring to an imaging surface of the photographing device 3000. This being so, the drive control unit 3001 causes the driving unit 3002 to drive the active prism 3003 so as to counteract the converted amounts of rotation. As a consequence of this, the movements occurring to the photographing device 3000 can be canceled.

The driving unit 3002 is an actuator or the like, and drives the active prism 3003. The active prism 3003 is a part of an optical system, and can correct video jitter by changing the prism angle. A lens 3004 is a part of an optical system, and forms light entering the photographing unit 102 into an image on an image capturing surface of an imaging element 3005. The imaging element 3005 is a solid-state image sensing device, such as a CCD (Charge Coupled Device) or a CMOS (Complementary Metal Oxide Semiconductor), and converts light from the lens 3004 into an electric signal.

As described, using the parameters calculated by the parameter calculating unit 140, the drive control unit 3001 causes the driving unit 3002 to drive the active prism 3003. As a result, the video jitter occurring to the video data can be corrected.

In the photographing device 3000 of the present embodiment, the video jitter is corrected through driving the active prism 3003. However, note that the photographing device of the present invention may correct the video jitter through driving the lens 3004 or the imaging element 3005. To be more specific, the drive control unit 3001 causes the driving unit 3002 to shift or rotate the imaging element 3005, so that the video jitter can be corrected.

Although the photographing device in the present invention has been described on the basis of the embodiments, the present invention is not limited to these embodiments. The present invention includes: modifications obtained through the application of various modifications, that may be conceived by a person with an ordinary skill in the art, to the above embodiments without departing from the scope of the present invention; and other embodiments implemented through a combination of arbitrary components from the above embodiments.

For example, in the above embodiments, the sensor unit 101 has an acceleration sensor for measuring acceleration in three axis directions and an angular velocity sensor for measuring angular velocities around the three axes. However, another sensor, such as an orientation sensor, that can determine movements of the photographing device can be combined with the above two sensors. As long as the sensor can determine a movement in its target axis, the installation method may be arbitrary. In other words, a required number of sensors may be installed for determining movements in only one axis. Or, an acceleration sensor, an angular velocity sensor, and the like in which sensors for obtaining measurements in three axes orthogonal to one another are combined into one package may be installed.

Moreover, the above embodiments describe a case, as an example, where the optical axis of the photographing device and the z axis which is one of the measurement axes of the sensors coincide with each other. However, a measurement axis of the sensor and an axis of movement, which occurs to the photographing device and is a subject of identification, do not necessarily coincide with each other. In such a case, information about the movement which occurs to the photographing device and is a subject of identification (namely, the rotational directions of the roll, pitch, and yaw axes of the photographing device in the first embodiment) needs to be obtained according to a method such as vector analysis.

Furthermore, in the above embodiments, the feature vector generating unit 131 may increase the redundancy of the feature vector which is to be generated, according to a known method such as principal component analysis. Also, the feature vector generating unit 131 may generate information of a motion frequency obtained through frequency analysis or the like, as a feature vector.

Moreover, the above embodiments describe the classifier of each rotational direction that associates the sensor information with the motion direction (i.e., the rotational direction) of the photographing device according to AdaBoost. The classifier of each rotational direction is not necessarily limited to a classifier configured according to AdaBoost. For example, the classifier of each rotational direction may be a classifier generated through the execution of learning identical to the one described above using a neural network. In this case, since a feature vector does not need to be a code, the feature vector generating unit 131 may generate a feature vector appropriate to the neural network.

Furthermore, the classifiers are not limited to those which identify the rotational directions. For example the classifiers may identify the motion directions in the x, y, and z axes.

In the above embodiments, the constraint condition generating unit 130 generates a constraint condition when a rotational direction classifier identifies that the photographing device rotates in the positive or negative direction. However, the constraint condition generating unit 130 may also generate a constraint condition when the classifier identifies no rotation in either the positive or negative direction. For example, when the roll direction classifier 132 identifies no rotation in the roll direction, the constraint condition generating unit 130 may use a predetermined search width s to generate a constraint condition under which a range of ±s is set as a search range of a solution of a tilt parameter. In this case, the tilt angle detecting unit 141 searches for a tilt parameter having the highest evaluation value within the range of ±s set by the constraint condition generating unit 130. As another example, when the pitch direction classifier 133 and the yaw direction classifier 134 identify no rotations in the pitch and yaw directions respectively, the constraint condition generating unit 130 may generate a constraint condition such that an appropriate range around a position at which coordinates are identical to those of the corresponding feature point in the standard image is set as a search range. This allows the parameter calculating unit 140 to calculate the parameters with high accuracy.

Figure 18:
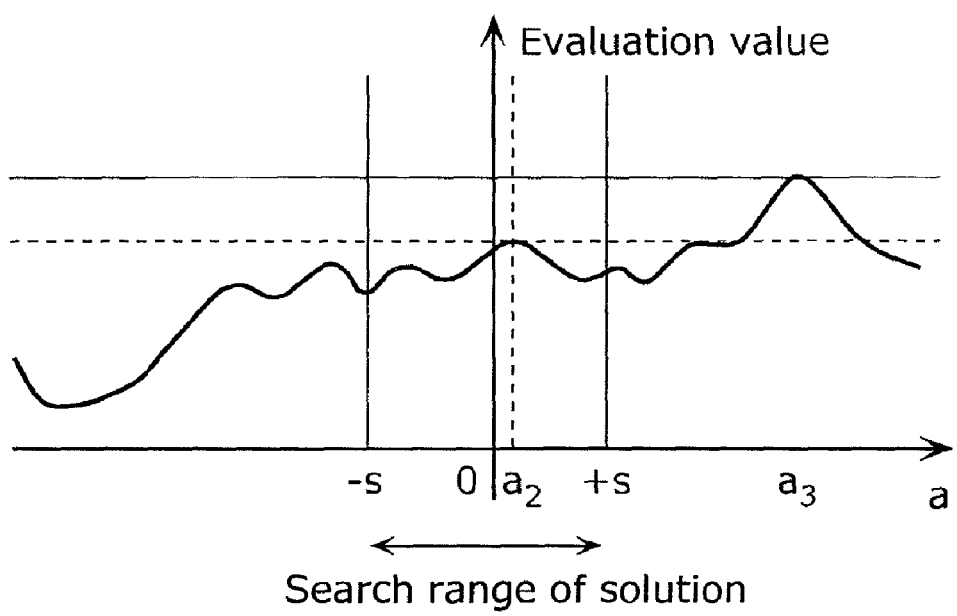
FIG. 18 is a diagram for explaining a search range of a solution of the tilt parameter in the case where no rotation is identified in the roll direction.

FIG. 18 is a diagram for explaining a search range of a solution of the tilt parameter in the case where no rotation is identified in the roll direction. As shown in FIG. 18, using the constraint condition under which the range of ±0 is a search range of the solution, the tilt angle detecting unit 141 can calculate a=a2 as the correct tilt angle, instead of a=a3 where the evaluation value is the highest.

Moreover, in order to compensate for identification errors made by the rotational direction classifiers, the constraint condition generating unit 130 may generate a constraint condition such that a range extended by a predetermined width as compared with the ranges in the above embodiments is set as a search range. For example, when a movement in the yaw direction is determined as being in "the positive direction", the constraint condition generating unit 130 generates a constraint condition such that a range expressed by a≧−s is set as a search range, instead of a≧0 exactly. When a movement in the yaw direction is determined as being in "the negative direction", the constraint condition generating unit 130 generates a constraint condition such that a range expressed by a≦s is set as a search range. Thus, the parameter calculating unit 140 can correctly calculate a parameter even when a rotational direction classifier incorrectly identifies a movement in the corresponding rotational direction due to a fluctuation component present when the evaluation value Z is calculated. Also, the parameter calculating unit 140 can correctly calculate a parameter even when a small gentle movement that cannot be detected by the sensors occurs. This is to say, through such compensation processing performed by the constraint condition generating unit 130, the degree of accuracy in calculation executed by the parameter calculating unit 140 can be further raised.

In the above embodiments, the constraint condition generating unit 130 generates a constraint condition to limit a range of a parameter value (solution) for the parameter calculation executed by the parameter calculating unit 140, according to a movement of the photographing device that is identified by the rotational direction classifiers. However, the photographing device of the present invention is not limited to such a photographing device. For example, the photographing device of the present invention may generate a constraint condition to assign a weight to the parameter according to the movement of the photographing device that is identified by the rotational direction classifiers. In such a case, using the weight included in the constraint condition, the parameter calculating unit 140 calculates an evaluation value for each value that is to be a candidate (candidate value) of the solution. Then, the parameter calculating unit 140 determines a candidate value having the highest calculated evaluation value, as the parameter.

In the above embodiments, the jitter detecting unit 142 calculates the amount of translation through the feature-point matching. However, it is not limited to the feature-point matching.

For example, the jitter detecting unit 142 may calculate the amount of translation using a different matching method, such as an optical flow technique or a pattern matching technique.

In the above embodiments, the jitter detecting unit 142 calculates the amount of translation. However, using the matching method whereby rotation and translation can be treated at the same time, the jitter detecting unit 142 may calculate a rotational angle and the amount of translation at the same time. For example, the jitter detecting unit 142 may project an image onto a sphere and rotate the sphere around the origin so as to perform matching. With this, the jitter detecting unit 142 can perform matching in the roll, pitch, and yaw directions at the same time. Then, the image correcting unit 150 rotates the image projected onto the sphere by the amounts of rotation calculated by the jitter detecting unit 142 in the roll, pitch, and yaw directions. In addition, by re-projecting the rotated image onto a plane surface, the image correcting unit 150 can execute correction in terms of both rotation and translation.

Moreover, the jitter detecting unit 142 may calculate the amount of translation and so forth, according to an analytical method such as a POC (Phase-Only Correlation) method, instead of a matching method. In the case where the POC method is employed, rotation and translation cannot be treated at the same time. For this reason, it is preferable that, using the tilt angel of the image determined by the tilt angle detecting unit 141, the jitter in a rotational element should be removed from the image before the jitter detecting unit 142 calculates the amount of translation.

In the above embodiments, the parameter calculating unit 140 calculates the parameters used in alignment performed between the images which are included in the video data and are temporally adjacent. Note that, however, the photographing device of the present invention does not necessarily calculate the parameters for the images which are temporally adjacent. For example, the parameter calculating unit 140 may determine a standard image in advance and then calculate the parameters used in alignment to be performed between the determined image and another image.

It should be noted that the present invention can be realized not only as such a photographing device, but also as an image processing device that includes the components included in the image processing unit of the photographing device. Also, the present invention can be realized as an image processing method including steps corresponding to the characteristic components included in such an image processing device, or as a program causing a computer to execute such characteristic steps. It is obvious that such a program can be distributed via a recording medium such as a CD-ROM or via a transmission medium such as the Internet.

Figure 19:
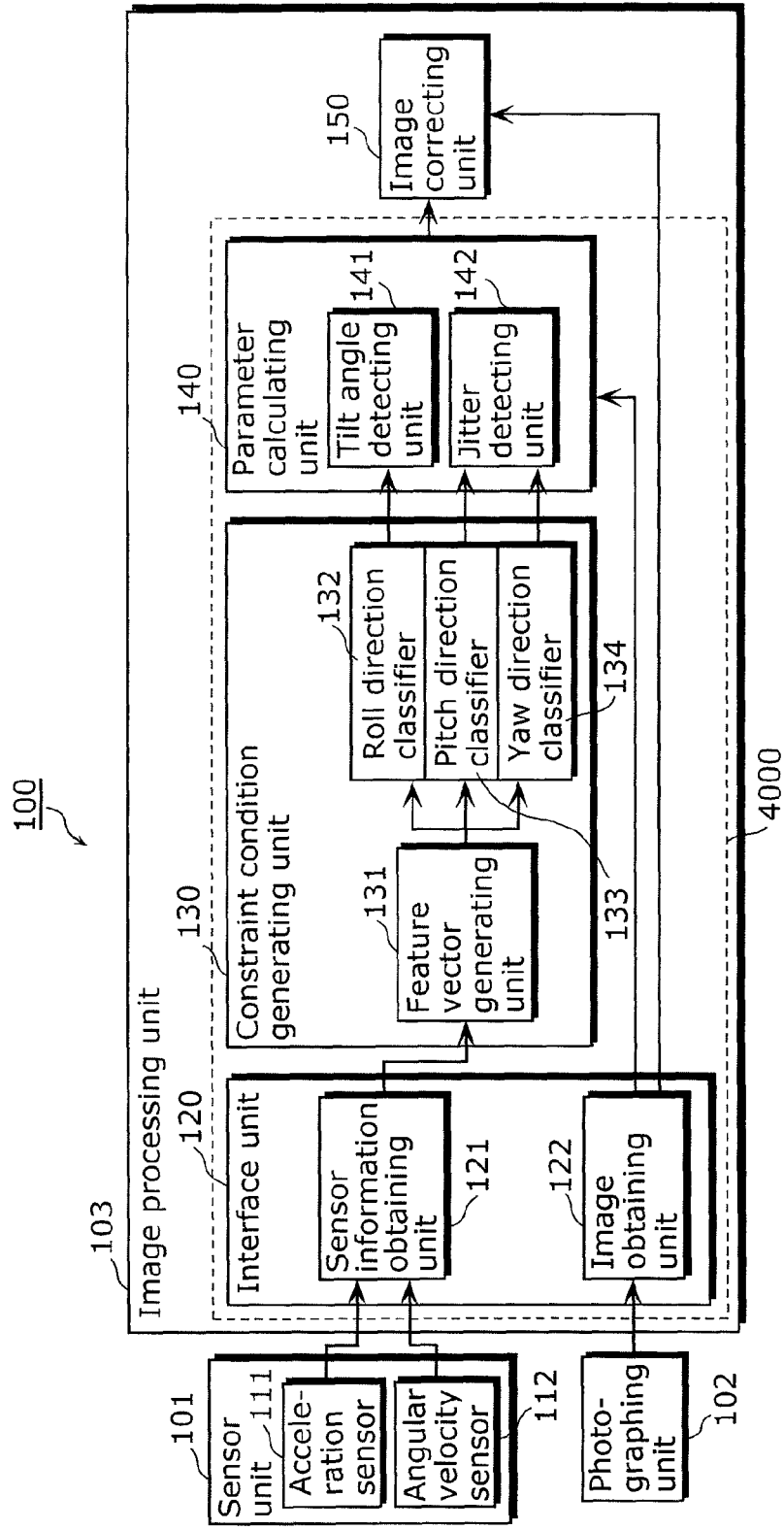
FIG. 19 is a block diagram showing a function configuration of an integrated circuit of the present invention.

Moreover, the present invention may be realized as a large-scale integrated circuit (LSI) that realizes all or a part of the functions of the image processing device. For example, as shown in FIG. 19, an integrated circuit 4000 includes at least an interface unit 120, a constraint condition generating unit 130, and a parameter calculating unit 140.

Figure 20:
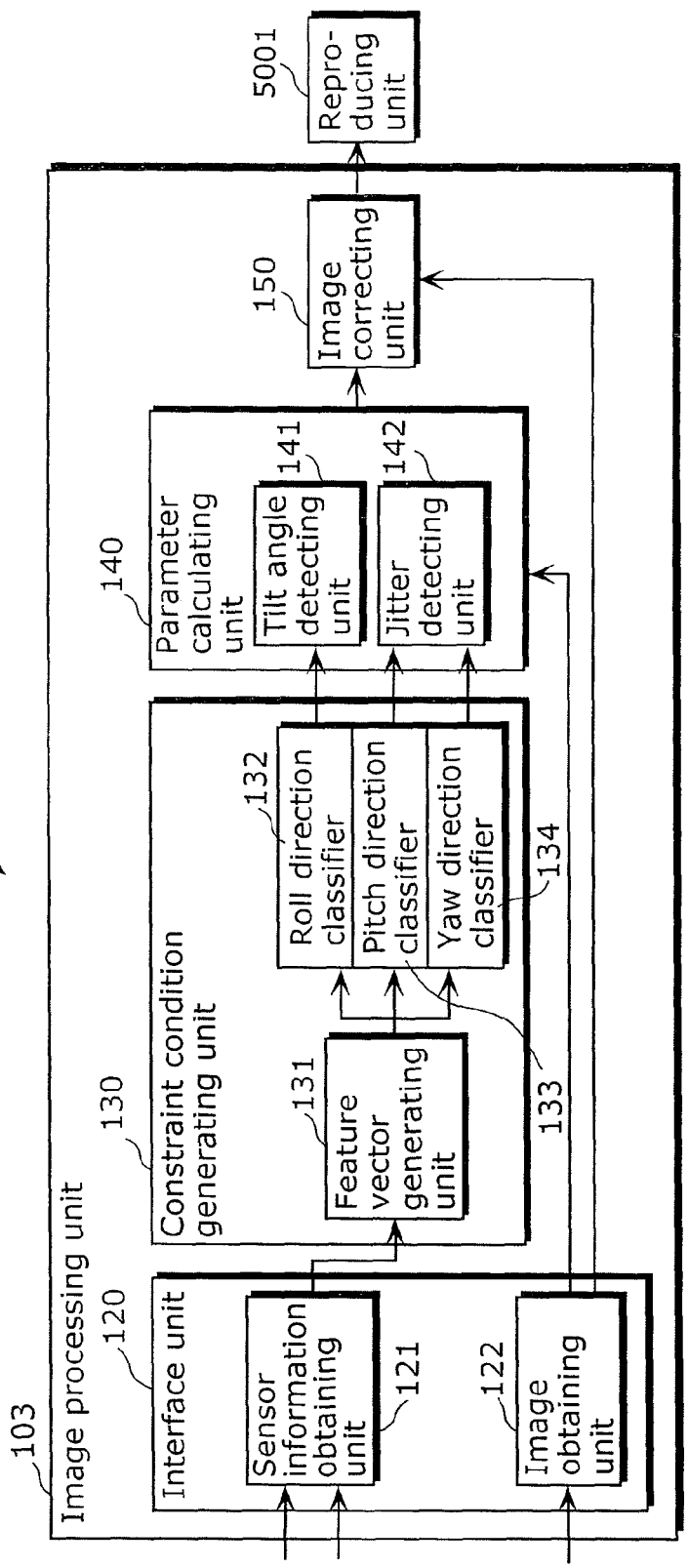
FIG. 20 is a block diagram showing a function configuration of a reproducing device of the present invention.

Furthermore, the present invention may be realized as a reproducing device that realizes all or a part of the functions of the image processing device. For example, as shown in FIG. 20, a reproducing device 5000 includes an image processing unit 103 and a reproducing unit 5001. The reproducing unit 5001 reproduces video data corrected by the image correcting unit 150.

Industrial Applicability

The photographing device of the present invention is useful as a device that corrects rotation of an image and variations in the image frame which are caused due to a movement occurring to the photographing device. The present invention can be applied not only to photographing devices including digital still cameras and digital video cameras, but to compact photographing devices that are attached to the body of a photographer to execute hands-free image capturing.

The invention claimed is:

1. An image processing device that calculates a parameter used in alignment performed on at least two images captured by a photographing device that has a sensor detecting a movement, said image processing device comprising:
    an image obtaining unit configured to obtain an image captured by the photographing device;
    a sensor information obtaining unit configured to obtain sensor information that is an output signal from the sensor, the output signal being provided when the image obtained by said image obtaining unit is captured;
    a constraint condition generating unit configured to generate a constraint condition using the sensor information obtained by said sensor information obtaining unit such that a value of a parameter to be calculated falls within a range; and
    a parameter calculating unit configured to calculate the parameter related to the image obtained by said image obtaining unit, according to the constraint condition generated by said constraint condition generating unit, wherein said constraint condition generating unit includes:
a feature vector generating unit configured to generate a feature vector showing a feature of the sensor information obtained by said sensor information obtaining unit; and
a motion classifying unit configured to identify a movement of the photographing device according to the feature vector generated by said feature vector generating unit, on the basis of an association between the feature vector and the movement of the photographing device,
the association is obtained as a result of previously-executed machine learning of the feature vector and an actual movement of the photographing device, and
said constraint condition generating unit is configured to generate the constraint condition by determining the range corresponding to the movement of the photographing device, the movement being identified by said motion classifying unit.

2. The image processing device according to claim 1, wherein said parameter calculating unit is configured to calculate a tilt angle of the image as the parameter.

3. The image processing device according to claim 2, wherein said parameter calculating unit is configured to calculate the tilt angle of the image as the parameter by extracting, from the image, a tilt of an element that shows one of an absolute horizontal and an absolute vertical.

4. The image processing device according to claim 3, wherein said constraint condition generating unit is configured to generate the constraint condition that includes a weight assigned to the tilt angle of the image, and
said parameter calculating unit is configured to calculate an evaluation value for each tilt angle of the image using the weight included in the constraint condition, and select a tilt angle having a highest calculated evaluation value as the parameter.

5. The image processing device according to claim 1, wherein said image obtaining unit is configured to obtain at least two images that include a same subject image and are captured at different times, and
said parameter calculating unit is configured to calculate a relative amount of displacement of the subject image between the two images.

6. The image processing device according to claim 5, wherein said parameter calculating unit is configured to calculate the relative amount of displacement as an affine transformation parameter used for transforming at least one of the two images.

7. The image processing device according to claim 6, wherein said constraint condition generating unit is configured to generate the constraint condition that includes a weight assigned to the relative amount of displacement, and
said parameter calculating unit is configured to calculate an evaluation value for each relative amount of displacement using the weight included in the constraint condition, and select a relative amount of displacement having a highest calculated evaluation value as the parameter.

8. The image processing device according to claim 1, further comprising
an image correcting unit configured to correct the image, using the parameter calculated by said parameter calculating unit.

9. The image processing device according to claim 1, wherein said sensor information obtaining unit is configured to obtain the sensor information from the sensor which is at least one of an angular velocity sensor type, an acceleration sensor type, and an orientation sensor type.

10. The image processing device according to claim 1, wherein said motion classifying unit is configured to identify at least one of a rotational direction for each of three axes and a translational direction for each of the three axes, the three axes including an optical axis of the photographing device and two orthogonal axes each of which is orthogonal to the optical axis.

11. A photographing device that photographs a subject, said photographing device comprising:
an optical system;
an imaging element;
a sensor unit configured to detect a movement of said photographing device; and
said image processing device according to claim 1.

12. The photographing device according to claim 11, further comprising:
a driving unit configured to drive at least one of said optical system and said imaging element; and
a drive control unit configured to calculate an amount of displacement on an imaging surface of said photographing device using the parameter calculated by said parameter calculating unit and a predetermined parameter unique to said photographing device, and to cause said driving unit to drive at least one of said optical system and said imaging element so as to counteract the calculated amount of displacement.

13. The photographing device according to claim 11, wherein said sensor unit is configured by a sensor which is at least one of an angular velocity sensor type, an acceleration sensor type, and an orientation sensor type.

14. A reproducing device that reproduces an image, comprising:
said image processing device according to claim 8; and
a reproducing unit configured to reproduce the image corrected by said image correcting unit.

15. An image processing method of calculating a parameter used in alignment performed on at least two images captured by a photographing device that has a sensor detecting a movement, said image processing method comprising:
obtaining an image captured by the photographing device;
obtaining sensor information that is an output signal from the sensor, the output signal being provided when the image obtained in said obtaining of the image is captured;
generating a constraint condition using the sensor information obtained in said obtaining of the sensor information such that a value of a parameter to be calculated falls within a range; and
calculating the parameter related to the image obtained in said obtaining of the image, according to the constraint condition generated in said generating,
wherein said generating includes:
generating a feature vector that shows a feature of the sensor information obtained in said obtaining of the sensor information; and
identifying a movement of the photographing device according to the feature vector generated in said generating of the feature vector, on the basis of an association between the feature vector and the movement of the photographing device,
the association is obtained as a result of previously-executed machine learning of the feature vector and an actual movement of the photographing device, and the constraint condition is generated in said generating of the constraint condition by determining the range corresponding to the movement of the photographing device, the movement being identified in said identifying.

16. A non-transitory readable recording medium comprising a program that causes a computer to execute said steps included in said image processing method according to claim 15.

17. An integrated circuit that calculates a parameter used in alignment performed on at least two images captured by a photographing device that has a sensor detecting a movement, said integrated circuit comprising:
  an image obtaining unit configured to obtain an image captured by the photographing device;
  a sensor information obtaining unit configured to obtain sensor information that is an output signal from the sensor, the output signal being provided when the image obtained by said image obtaining unit is captured;
  a constraint condition generating unit configured to generate a constraint condition using the sensor information obtained by said sensor information obtaining unit such that a value of a parameter to be calculated falls within a range; and
  a parameter calculating unit configured to calculate the parameter related to the image obtained by said image obtaining unit, according to the constraint condition generated by said constraint condition generating unit,
  wherein said constraint condition generating unit includes:
  a feature vector generating unit configured to generate a feature vector showing a feature of the sensor information obtained by said sensor information obtaining unit; and
  a motion classifying unit configured to identify a movement of the photographing device according to the feature vector generated by said feature vector generating unit, on the basis of an association between the feature vector and the movement of the photographing device,
  the association is obtained as a result of previously-executed machine learning of the feature vector and an actual movement of the photographing device, and
  said constraint condition generating unit is configured to generate the constraint condition by determining the range corresponding to the movement of the photographing device, the movement being identified by said motion classifying unit.

* * * * *